US010931224B2

(12) United States Patent
Praca et al.

(10) Patent No.: US 10,931,224 B2
(45) Date of Patent: Feb. 23, 2021

(54) SINGLE AXIS IN-LINE GEARBOX MODULAR TRACKER SYSTEM

(71) Applicant: RBI Solar, Inc., Cincinnati, OH (US)

(72) Inventors: Miguel Martinho Lopes Praca, Kentfield, CA (US); Yury Reznikov, Danville, CA (US)

(73) Assignee: RBI Solar, Inc., Cincinnati, OH (US)

( * ) Notice: Subject to any disclaimer, the term of this patent is extended or adjusted under 35 U.S.C. 154(b) by 338 days.

(21) Appl. No.: 15/610,532

(22) Filed: May 31, 2017

(65) Prior Publication Data
US 2017/0353146 A1 Dec. 7, 2017

Related U.S. Application Data

(60) Provisional application No. 62/392,524, filed on Jun. 3, 2016, provisional application No. 62/495,276, filed on Sep. 8, 2016.

(51) Int. Cl.
*H02S 20/32* (2014.01)
*F16H 1/32* (2006.01)
(Continued)

(52) U.S. Cl.
CPC .......... *H02S 20/32* (2014.12); *F16C 11/0609* (2013.01); *F16H 1/32* (2013.01);
(Continued)

(58) Field of Classification Search
None
See application file for complete search history.

(56) References Cited

U.S. PATENT DOCUMENTS

| 4,429,178 A | 1/1984 | Prideaux et al. |
| 4,628,142 A | 12/1986 | Hashizume |

(Continued)

FOREIGN PATENT DOCUMENTS

| CN | 102439379 A | 5/2012 |
| CN | 103097829 A | 5/2013 |

(Continued)

OTHER PUBLICATIONS

PCT Office, International Search Report and Written Opinion issued in PCT/US2017/035459 dated Sep. 18, 2017, 16 pages.
(Continued)

*Primary Examiner* — Tamir Ayad
(74) *Attorney, Agent, or Firm* — Wood Herron & Evans LLP

(57) ABSTRACT

Modular tracker systems that include at least first and second tables or are continuous without the use of tables, a single motor driving the first and second tables, first and second intra-table drive shafts and an inter-table drive shaft. Each table includes a support structure including first and second mounting posts, a frame supported by the support structure, at least one solar panel supported by the frame, and first and second gearboxes being concentrically aligned for each table. The first and second gearboxes are each configured to produce first and second outputs. The first output has a first rotational speed, and the second output has a second rotational speed less than the first rotational speed, and is operatively coupled to the frame. The inter-table drive shaft couples the second gearbox of the first table with the first gearbox of the second table, whereby the first and second tables are rotated synchronously.

19 Claims, 22 Drawing Sheets

(51) Int. Cl.

| | | |
|---|---|---|
| *F24S 30/425* | (2018.01) | |
| *F16C 11/06* | (2006.01) | |
| *F24S 30/458* | (2018.01) | |
| *F16H 21/44* | (2006.01) | |
| *F24S 30/00* | (2018.01) | |
| *F16C 1/08* | (2006.01) | |
| *F16C 1/02* | (2006.01) | |
| *F16D 3/26* | (2006.01) | |

(52) U.S. Cl.
CPC ............ *F16H 21/44* (2013.01); *F24S 30/425* (2018.05); *F24S 30/458* (2018.05); *F16C 1/02* (2013.01); *F16C 1/08* (2013.01); *F16D 3/26* (2013.01); *F24S 2030/11* (2018.05); *F24S 2030/131* (2018.05); *F24S 2030/134* (2018.05); *F24S 2030/136* (2018.05); *F24S 2030/17* (2018.05); *Y02E 10/47* (2013.01)

(56) References Cited

U.S. PATENT DOCUMENTS

| | | | |
|---|---|---|---|
| 4,995,377 A | 2/1991 | Eiden | |
| 5,531,216 A | 7/1996 | Nicklas et al. | |
| 5,632,823 A | 5/1997 | Sharan | |
| 6,058,930 A | 5/2000 | Shingleton | |
| 6,293,167 B1* | 9/2001 | Latz | B62D 1/187 |
| | | | 464/112 |
| 7,252,083 B2 | 8/2007 | Hayden | |
| 7,647,924 B2 | 1/2010 | Hayden | |
| 7,836,879 B2 | 11/2010 | Mackamul | |
| 7,968,791 B2 | 6/2011 | Do et al. | |
| 8,100,807 B2* | 1/2012 | Miyoshi | F24S 30/452 |
| | | | 475/178 |
| 8,136,783 B2 | 3/2012 | Pietrzak | |
| 8,161,962 B2 | 4/2012 | Kuo | |
| 8,188,413 B2 | 5/2012 | Kats et al. | |
| 8,188,415 B2 | 5/2012 | Kats et al. | |
| 8,203,110 B2 | 6/2012 | Silvestre Mata | |
| 8,210,162 B2 | 7/2012 | Simmers | |
| 8,322,333 B2 | 12/2012 | Marcotte et al. | |
| 8,378,281 B2 | 2/2013 | Kats et al. | |
| 8,407,950 B2 | 4/2013 | Hartelius | |
| 8,459,249 B2 | 6/2013 | Corio | |
| 8,528,542 B2 | 9/2013 | Ustun | |
| 8,536,504 B2 | 9/2013 | Kats et al. | |
| 8,541,679 B2 | 9/2013 | Wang | |
| 8,578,929 B2 | 11/2013 | Krabbe et al. | |
| 8,592,738 B1 | 11/2013 | Kozin et al. | |
| 8,609,977 B2 | 12/2013 | Jones et al. | |
| 8,671,930 B2 | 3/2014 | Liao | |
| 8,671,931 B2 | 3/2014 | Curtis et al. | |
| 8,686,334 B2 | 4/2014 | Kats et al. | |
| 8,720,431 B2 | 5/2014 | Kufner | |
| 8,763,602 B2 | 7/2014 | Lehle | |
| 8,807,129 B2 | 8/2014 | Mackamul | |
| 8,808,126 B2 | 8/2014 | Lee et al. | |
| 8,835,747 B2 | 9/2014 | Miller et al. | |
| 8,842,214 B2 | 9/2014 | Aoki et al. | |
| 8,881,415 B2 | 11/2014 | Barton | |
| 8,881,720 B2 | 11/2014 | Currier | |
| 8,890,044 B2 | 11/2014 | Sherman et al. | |
| 8,904,774 B2 | 12/2014 | Gee | |
| 8,920,278 B2 | 12/2014 | Tanaka et al. | |
| 8,931,222 B2 | 1/2015 | Alberto | |
| 8,939,648 B2 | 1/2015 | Schneider et al. | |
| 9,016,271 B2 | 4/2015 | Carrascosa Perez et al. | |
| 9,074,797 B2 | 7/2015 | Miller et al. | |
| 9,188,367 B2 | 11/2015 | Jang | |
| 9,252,307 B2 | 2/2016 | Hartelius | |
| 9,276,522 B1 | 3/2016 | Au | |
| 9,322,437 B2 | 4/2016 | Agullo | |
| 9,347,692 B2 | 5/2016 | Pizzarello et al. | |
| 9,350,216 B2 | 5/2016 | Labriola, II | |
| 9,353,781 B2 | 5/2016 | Morgan | |
| 9,395,104 B2 | 7/2016 | Grushkowitz | |
| 9,455,664 B2 | 9/2016 | Barton | |
| 9,466,749 B1 | 10/2016 | Au | |
| 2006/0044511 A1 | 3/2006 | Mackamul | |
| 2008/0308091 A1 | 12/2008 | Corio | |
| 2008/0314440 A1* | 12/2008 | Clemens | H01L 31/0547 |
| | | | 136/251 |
| 2009/0159075 A1 | 6/2009 | Mackamul | |
| 2010/0043776 A1 | 2/2010 | Gee | |
| 2010/0051086 A1* | 3/2010 | Keshner | H02S 40/32 |
| | | | 136/246 |
| 2010/0101632 A1 | 4/2010 | Kats et al. | |
| 2010/0139647 A1 | 6/2010 | Silvestre Mata | |
| 2010/0252030 A1 | 10/2010 | Marcotte et al. | |
| 2010/0258110 A1 | 10/2010 | Krabbe et al. | |
| 2011/0155120 A1 | 6/2011 | Barsun et al. | |
| 2011/0240006 A1 | 10/2011 | Linke et al. | |
| 2011/0284055 A1 | 11/2011 | Almogy et al. | |
| 2012/0180845 A1 | 7/2012 | Cole et al. | |
| 2012/0216852 A1 | 8/2012 | Almy et al. | |
| 2013/0048582 A1 | 2/2013 | Kruse | |
| 2013/0152915 A1 | 6/2013 | Marten et al. | |
| 2013/0180568 A1 | 7/2013 | Hartelius | |
| 2014/0053825 A1 | 2/2014 | Zhou | |
| 2014/0054433 A1 | 2/2014 | Reisch et al. | |
| 2014/0090637 A1 | 4/2014 | Grushkowitz | |
| 2014/0090638 A1 | 4/2014 | Grushkowitz | |
| 2014/0090707 A1 | 4/2014 | Almogy et al. | |
| 2014/0102514 A1 | 4/2014 | Park et al. | |
| 2014/0174431 A9 | 6/2014 | Mackamul | |
| 2014/0216522 A1 | 8/2014 | Au | |
| 2014/0338659 A1 | 11/2014 | Corio | |
| 2015/0000721 A1 | 1/2015 | Au | |
| 2015/0001356 A1 | 1/2015 | Au | |
| 2015/0013750 A1 | 1/2015 | Meppelink et al. | |
| 2015/0128437 A1 | 5/2015 | Barton | |
| 2015/0144751 A1 | 5/2015 | Schneider et al. | |
| 2015/0167747 A1* | 6/2015 | Honda | F16D 3/387 |
| | | | 403/378 |
| 2015/0214885 A1 | 7/2015 | Wu | |
| 2015/0288326 A1 | 10/2015 | Au | |
| 2015/0316639 A1 | 11/2015 | Russ et al. | |
| 2016/0013751 A1 | 1/2016 | Michotte De Welle et al. | |
| 2016/0118931 A1 | 4/2016 | Hertelius | |
| 2016/0195303 A1 | 7/2016 | Lambert et al. | |
| 2016/0231027 A9 | 8/2016 | Corio | |
| 2016/0261232 A1 | 9/2016 | Grushkowitz et al. | |
| 2016/0308488 A1 | 10/2016 | Liu et al. | |
| 2016/0329860 A1 | 11/2016 | Kalus et al. | |
| 2016/0365830 A1 | 12/2016 | Bailey et al. | |
| 2016/0377325 A1 | 12/2016 | Au | |

FOREIGN PATENT DOCUMENTS

| | | |
|---|---|---|
| CN | 203085586 U | 7/2013 |
| CN | 104539230 A | 4/2015 |
| CN | 105008819 A | 10/2015 |
| CN | 205190509 U | 4/2016 |
| DE | 202010000419 U1 | 6/2010 |
| KR | 20130022814 A | 3/2013 |
| WO | 0020770 A1 | 4/2000 |
| WO | 2011145499 A1 | 11/2011 |
| WO | 2011149589 A1 | 12/2011 |
| WO | 2013170718 A1 | 11/2013 |
| WO | 2014018560 A1 | 1/2014 |
| WO | 2014186079 A2 | 11/2014 |

OTHER PUBLICATIONS

The International Bureau of WIPO, International Preliminary Report on Patentability, International Application No. PCT/US2017/035459, dated Dec. 4, 2018 (10 pages).

China National Intellectual Property Administration, First Office Action, Application No. 201780046200.2, dated Mar. 2, 2020 (11 pages).

* cited by examiner

SINGLE AXIS IN-LINE GEARBOX MODULAR TRACKER SYSTEM

CROSS-REFERENCE TO RELATED APPLICATIONS

This application claims the filing benefit of U.S. Provisional Patent Application Ser. No. 62/392,524, filed on Jun. 3, 2016, and U.S. Provisional Patent Application Ser. No. 62/495,276, filed on Sep. 8, 2016, the disclosures of which are hereby incorporated herein by reference in their entireties.

TECHNICAL FIELD

This application relates generally to a modular solar tracker. More specifically, this application describes mechanisms and methods for coupling a plurality of solar panels together in a row using a single motor and multiple gearboxes.

BACKGROUND

Solar trackers rotate long rows and/or columns of solar panels so that the solar panels track the apparent path of the sun, thereby maximizing the amount of sunlight that is absorbed by the solar panels. In this regard, a conventional solar tracker generally uses a motor and a single gearbox to rotate a long stiff torque tube to effectively rotate the solar panels.

The desire to reduce the relative cost of the motor per solar panel is dependent on increasing the length of each row of solar panels. Depending on the number of solar panels in the row, the motor may need to generate an extremely high torque to impart sufficient torque to the torque tube to successfully overcome the torque generated by wind loads on the solar panels. In this regard, since a single motor is normally used for a row, or maybe used for multiple rows, the torque tubes need to be long, in some cases up to 300 feet or more. Unfortunately, long torque tubes develop large torsional deflections and are vulnerable to premature failure and low frequency vibration due to the torsional loads and thermal expansion axially through the torque tubes. For each table added to a row, the load torque increases along the entire tube requiring a higher total ratio of material per solar panel. This leads to inefficient use of material, as the torque requirements of the long row of solar panels increases towards the point of the torque tube where the drive torque is applied.

Additionally, the long torque tube formed as a single structural element sustains the bending loads of the long row of solar panels. From the point of view of bending loads, which are generally even along the entire row, the tube section structural requirement is even along the row. However, from a torsional load point of view, the tube section structural requirement increases towards the point where the driving torque is applied. As such, single torque tube solar trackers are overdesigned in terms of bending loads, resulting in a less than optimal use of material.

In addition to single torque tube solar trackers, there are also dual tube solar trackers that use two tubes to transfer the torque from the row of solar panels back to the motor. Dual tube solar trackers generally have shorter rows, because it is a less efficient way of transferring torque, but these dual tube solar trackers trade that inefficiency for the simplicity of mounting the solar panels directly to the torque tubes, avoiding the need for mounting rails. In addition, the dual tube solar trackers have another advantage, as they allow the pivot point to be closer to the rotating mass center of gravity, which reduces static torsional loads. However, dual tube solar trackers are overdesigned for the bending loads for the same reasons described above for single torque tube solar trackers.

Clearly, a solution that provides the required bending capacity to the structure of long rows, without the significant added cost to transfer torque loads over longer rows, would result in more efficient use of material. Longer rows for a single motor result in a smaller burden per table cost of the motor and microcontroller. In addition to the efficient use of material, a solution that allows long rows to conform to ground undulations, which is not possible with stiff torque tube designs, results in fewer ground preparation requirements at installation sites.

Additionally, thermal behavior of long stiff tubes in environments that very often have wide temperature oscillations on a daily cycle create a difficult challenge that is sometimes ignored, with increased risk of failure. A system that includes smaller modular structures connected by flexible members better accommodates the thermal expansion-contraction cycles would solve the problem of thermal deformation without the need for complex compensation mechanisms.

Additionally, the dynamic response behavior of a long torque tube, with a very large inertial mass, results in very low natural frequencies. Matching low frequencies may be stimulated by wind effects, requiring expensive and complex dampening systems to prevent failure. A solar tracker that results in breaking up the inertia of the row into smaller sections driven by gear drives (e.g. a non-reversible gear drive) increases the value of resonant frequencies to a safe level not stimulated by wind dynamics, which avoids costly dampening mechanisms.

These problems represent an opportunity for a new design approach that results in functional improvements, assembly simplicity, and cost savings.

SUMMARY

According to an exemplary embodiment, a modular tracker system is provided which includes at least first and second tables rotatably arranged in a row. Each of the first and second tables includes a support structure including first and second mounting posts that are configured to be mounted in the ground, a frame supported by the support structure, at least one solar panel supported by the frame, and first and second gearboxes. The first gearbox is operatively coupled to the first mounting post. The first gearbox is configured to produce first and second outputs, where the first output has a first rotational speed and the second output has a second rotational speed that is less than the first rotational speed. The second output is operatively coupled to the frame. The second gearbox is operatively coupled to the second mounting post and is concentrically aligned with the first gearbox of the same table. The second gearbox is configured to produce first and second outputs, where the first output has the first rotational speed and the second output has the second rotational speed. The modular tracker system also includes a single motor driving both the first and second tables, a first and second intra-table drive shafts and an inter-table drive shaft. The first intra-table drive shaft connects the first and second gearboxes of the first table. The second intra-table drive shaft connects the first and second gearboxes of the second table. The inter-table drive shaft couples the second gearbox of the first table with the first gearbox of the second table to connect the first and second tables, whereby the first and second tables are rotated synchronously.

According to another exemplary embodiment, a modular tracker system is provided which includes at least first and second tables rotatably arranged in a row, a single motor driving both the first and second tables, and an inter-table drive shaft connecting the first and second tables. Each of the first and second tables include a support structure configured to be mounted in the ground, a frame supported by the support structure, at least one solar panel supported by the frame, and at least one gearbox supported by the support structure. The gearbox is configured to produce first and second outputs. The first output has a first rotational speed. The second output has a second rotational speed that is less than the first rotational speed. The second output is operatively coupled to the frame. The inter-table drive shaft couples the first output of the gearbox of the first table with an input of the gearbox of the second table, whereby the first and second tables are rotated synchronously.

According to another exemplary embodiment, a modular tracker system is provided which includes a support structure configured to be mounted in the ground, a frame supported by the support structure, a plurality of solar panels supported by the frame, first and second gearboxes, a single motor driving the modular tracker system, and a drive shaft connecting the first and second gearboxes. The first gearbox is supported by the support structure and is configured to produce first and second outputs. The first output has a first rotational speed and the second output has a second rotational speed that is less than the first rotational speed. The second output is operatively coupled to the frame. The second gearbox is supported by the support structure and concentrically aligned with the first gearbox. The second gearbox is configured to produce first and second outputs. The first output has the first rotational speed and the second output has the second rotational speed and is operatively coupled to the frame. The drive shaft couples the first output of the first gearbox with the input of the second gearbox, whereby the plurality of solar panels is rotated synchronously.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

Figure 1:
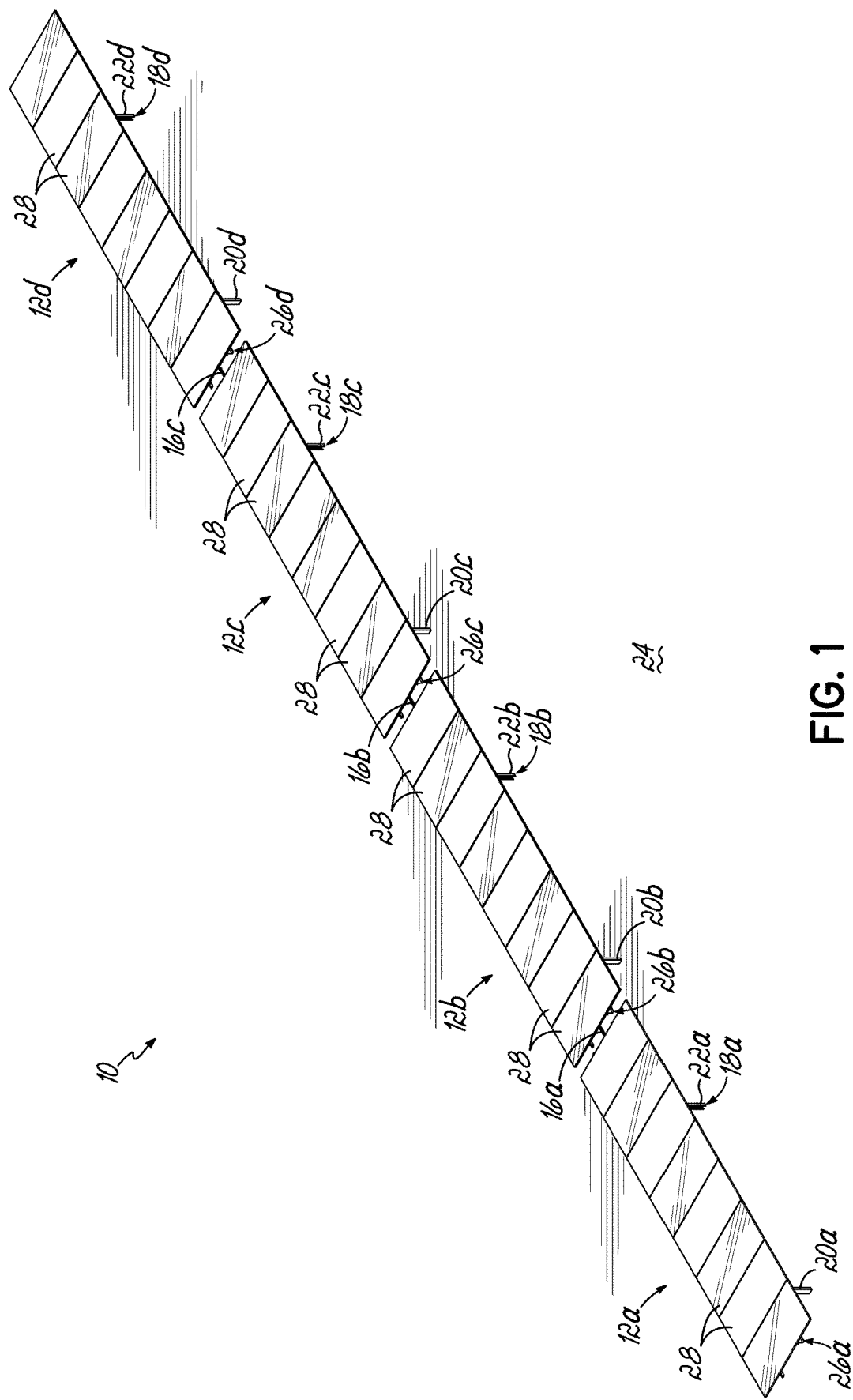
FIG. 1 is a perspective view of a modular tracker system including four tables, each table including solar panels in accordance with an embodiment of the invention.

With reference to FIG. 1, a modular tracker system 10 includes multiple tables (with first, second, third, and fourth tables 12a-d being shown in FIG. 1), a single motor 14 driving the tables, and inter-table drive shafts connecting adjacent tables (with first, second, and third inter-table drive shafts 16a-c being shown in FIG. 1). The inter-table drive shafts 16a-c and/or associated joints (e.g. universal joint) allow for misalignment (e.g. misalignment caused by uneven ground surfaces), which is problematic with a single stiff torque tube.

With continued reference to FIG. 1, the tables 12a-d respectively include first, second, third, and fourth support structures 18a-d. As shown, the support structures 18a-d each respectively include a first mounting post 20a-d and a second mounting post 22a-d, each configured to be mounted into the ground 24 or which may include a structure (not shown). Additionally, each table 12a-d respectively includes a frame 26a-d supported by the support structure 18a-d, at least one solar panel 28 supported by the frame 26a-d, and first and second gearboxes (with first, second, third, and fourth gearboxes 30a-d being shown in FIG. 2 with respect to the first and second tables 12a-b). Additional details and aspects of the gearboxes 30a-d are described below with reference to FIGS. 12A-13B.

The modular tracker system 10 enables the solar panels 28 to follow (i.e. track) the apparent path of the sun, thereby maximizing the amount of sunlight that is absorbed by the solar panels 28 for collection and/or distribution. While each table 12a-d shown in FIGS. 1 and 2 includes eight solar panels 28, more or less solar panels are also envisioned. The solar panels 28, also known as photo-voltaic panels, are shown in phantom in FIGS. 2 and 3 to better illustrate the relevant structures. Each solar panel is made up of an array of photo-voltaic cells, and the most common sizes are known as 60-cell modules and 72-cell modules. A variety of solar panels 28 may be used, 60-cell modules and 72-cell module versions, among others.

Figure 2:
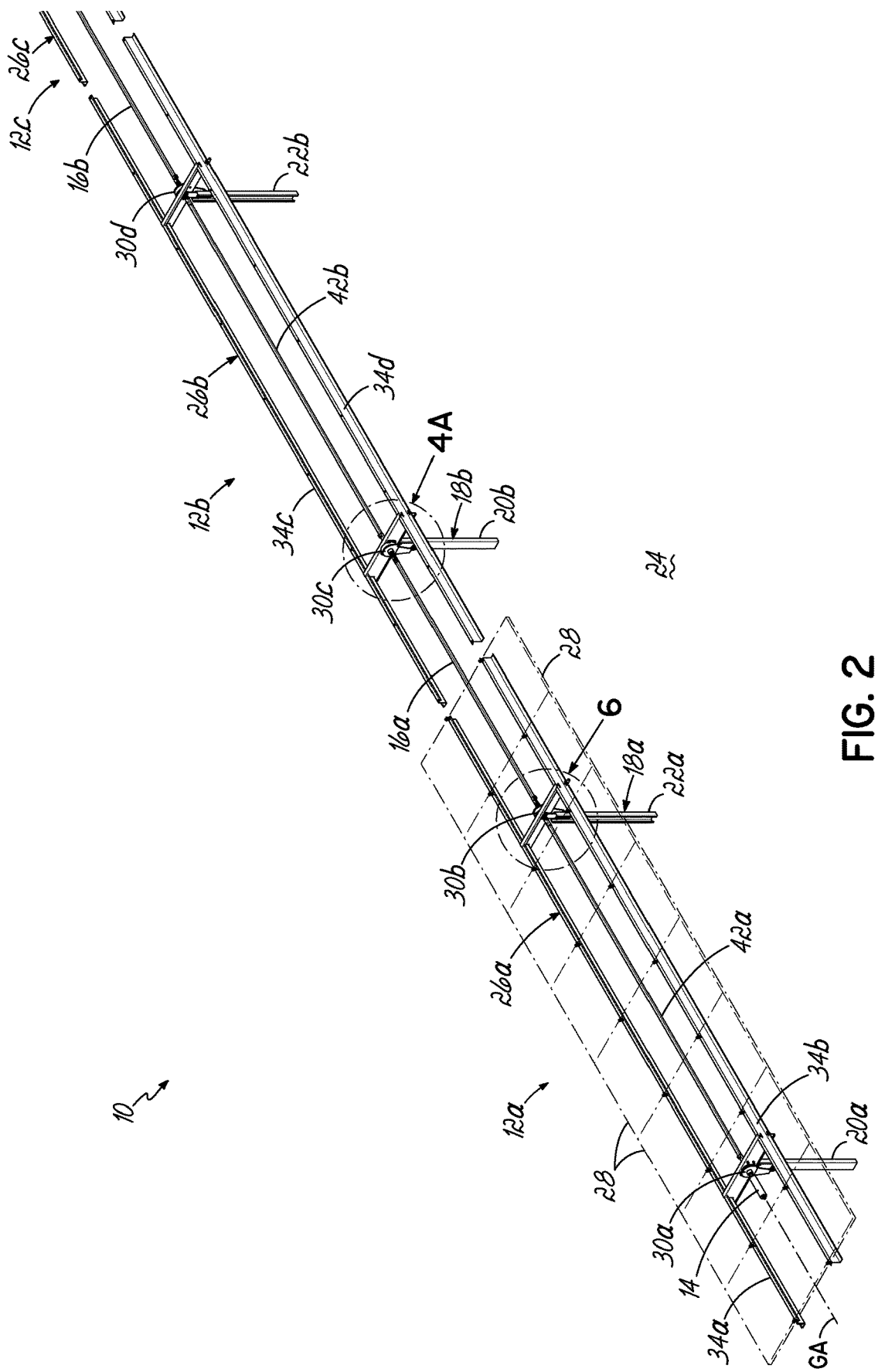
FIG. 2 is a perspective view of the modular tracker system of FIG. 1 focusing on two tables, with the solar panels of the first table being shown in phantom.
Figure 11:
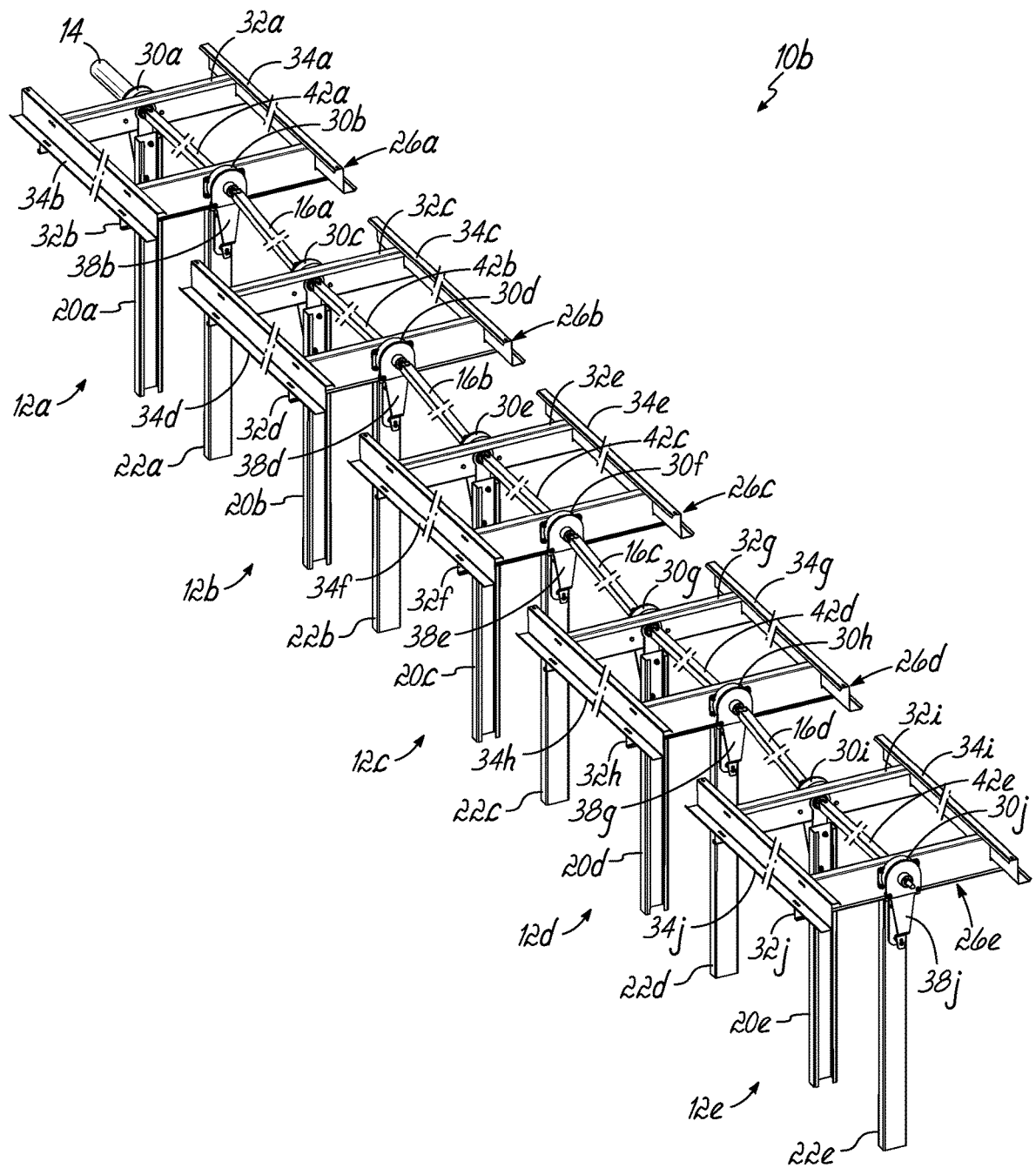
FIG. 11 is a perspective view of a modular tracker system including five tables, with the solar panels being omitted, in accordance with another embodiment of the invention.
Figure 12A:
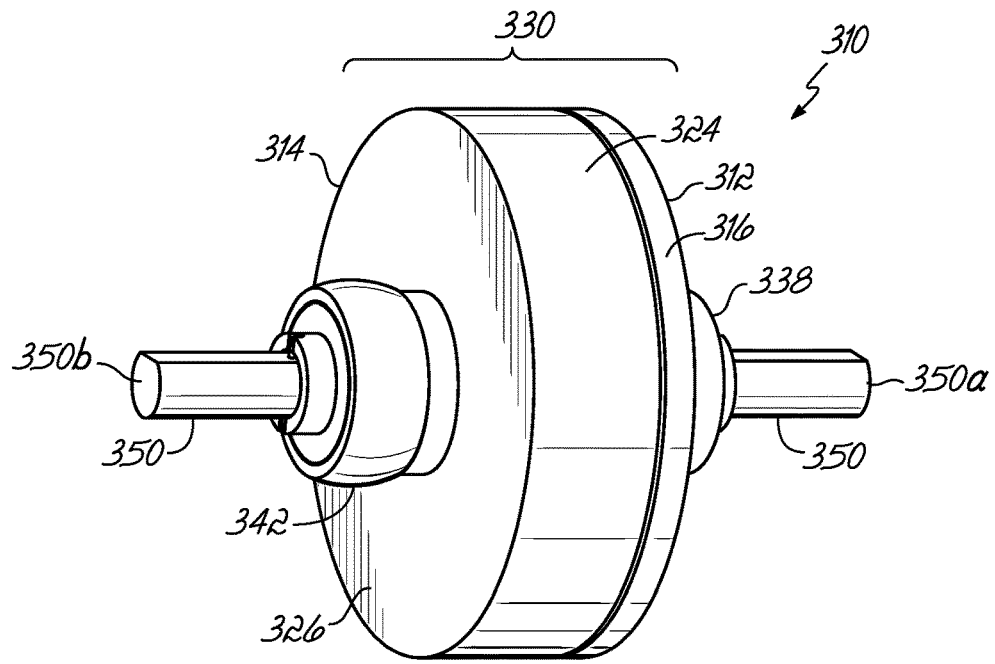
FIG. 12A is a perspective view of an exemplary gearbox for use with the modular tracker system.
Figure 12B:
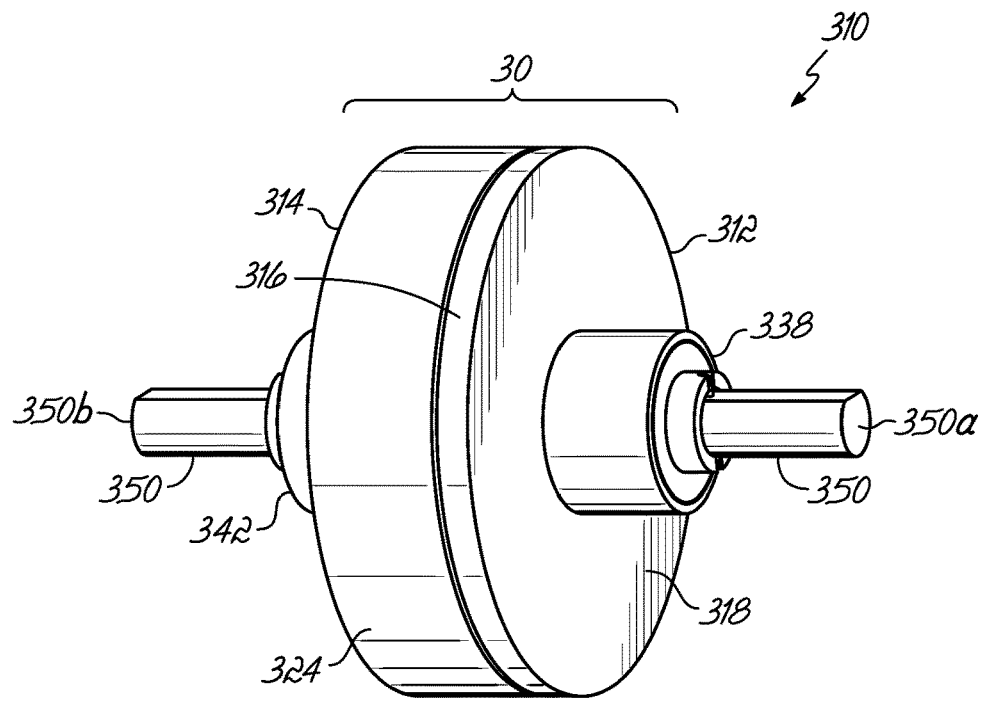
FIG. 12B is perspective view of the gearbox of FIG. 12A taken from another angle.
Figure 13A:
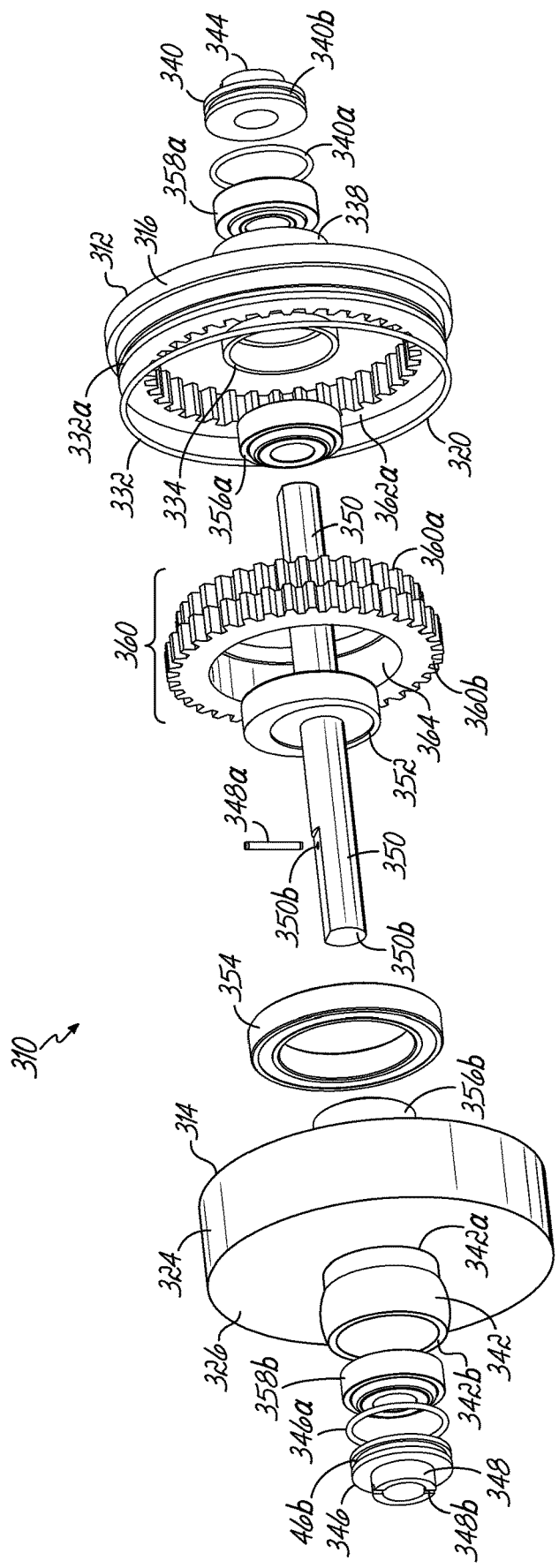
FIG. 13A is an exploded perspective view showing the internal components gearbox of FIG. 12A.
Figure 13B:
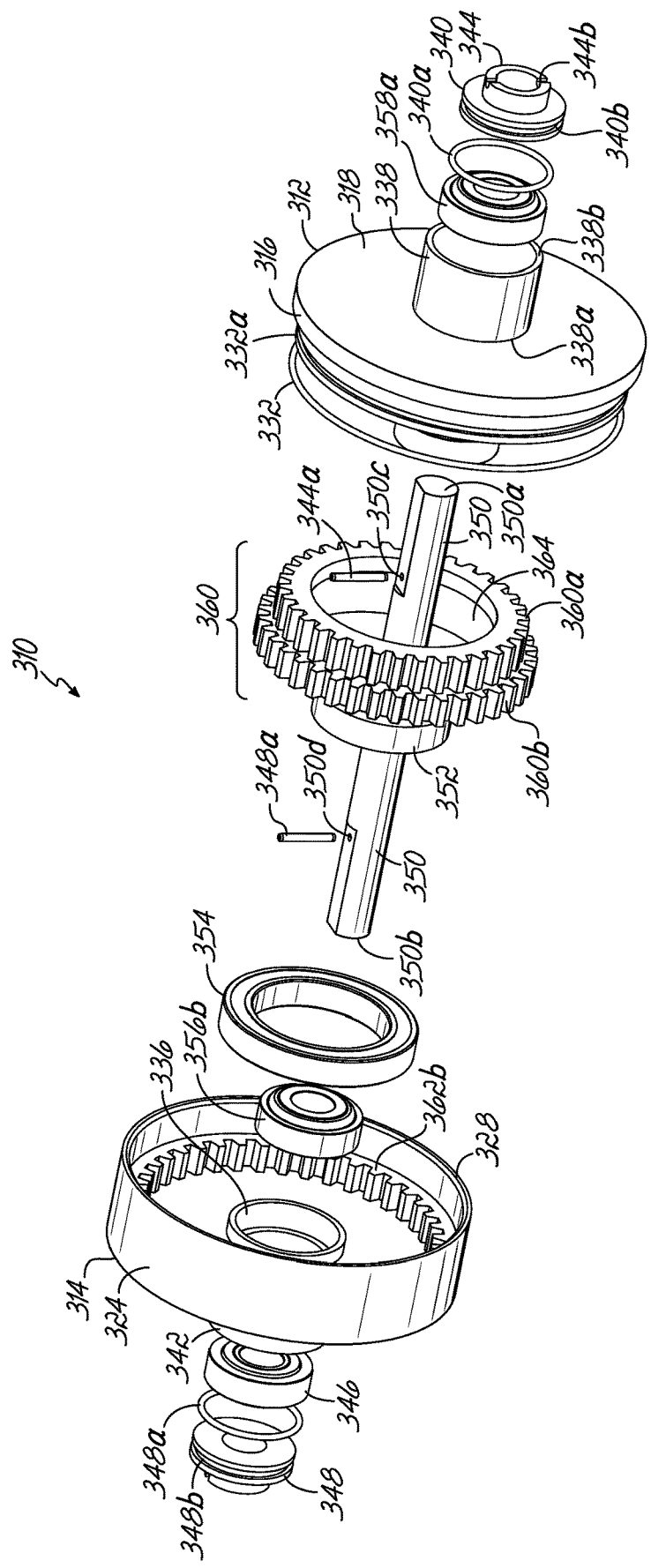
FIG. 13B is an exploded perspective view of the gearbox of FIG. 12B.

With respect to FIG. 2, the gearboxes of a respective table (e.g. the first and second gearboxes 30a-b with respect to the first table 12a) are concentrically aligned to define an axis of rotation ("GA") that coincides with the axis of the rotation of each respective table (e.g. the first table 12a). While the axis of rotation ("GA") shown in FIG. 2 is along a single common linear axis for both the first and second tables 12a-b, the modular tracker system 10 allows for concentrically aligned first and second gearboxes of each table 12a-d to have a unique axis of rotation, which may be different for adjacent tables (as shown in FIG. 11) with respect to the modular tracker system 10b. As such, any pair of gearboxes (e.g. the first and second gearboxes 30a-b) connected to the rotating frame are concentrically aligned to define the axis of rotation of the table, independently of the alignment of the first and second mounting posts 20a-d, 22a-d that support the gearboxes 30a-d. As shown, spherical bearings 124a-b (described with respect to the first table of FIG. 9A) may allow the first and second gearboxes 30a-b of the first table 12a to align with each other and the first and second gearboxes 30c-d of the second table 12b to align with each other and define the axis of rotation for a respective table. As shown in FIG. 9A, two gearboxes 30a-b of the first table 12a are connected with an intra-table drive shaft 42a (e.g. a rigid tube) coaxially aligned to the shafts of the two gearboxes 30a-b. Any misalignment "D" (shown in FIG. 9A) in the vertical direction between the first and second posts 20a, 22a of a single table is accommodated by the spherical bearings 124a-b. A similar self-alignment mechanism would accommodate a horizontal misalignment perpendicular to the axis of rotation. A third direction of misalignment, along the axis of rotation, is accommodated by elongate slots 112 (FIG. 7A) in the gearbox shafts.

This facilitates alignment of each table with gearboxes 30a-b and makes the construction of each table 12a-d easier by allowing for loose tolerances and no alignment procedure. The result is that consecutive tables of the modular tracker system 10 are not likely aligned with respect to a single common linear axis of rotation, but rather, the gearboxes of each respective table are aligned (as shown in FIG. 9A). Since the torque load carried by the inter-table drive shaft (e.g. first inter-table drive shaft 16a) is very small compared to the torque capacity of the gearboxes, the inter-table drive shaft may deflect and accommodate misalignment without generating large bending stresses, while still being able to carry the required torque.

Specific aspects of the modular tracker system 10 will now be described in relation to the figures, however, persons skilled in the art would appreciate that these principles may also apply to other tables and to a continuous modular tracker system, which is not separated into distinct tables.

Figure 3:
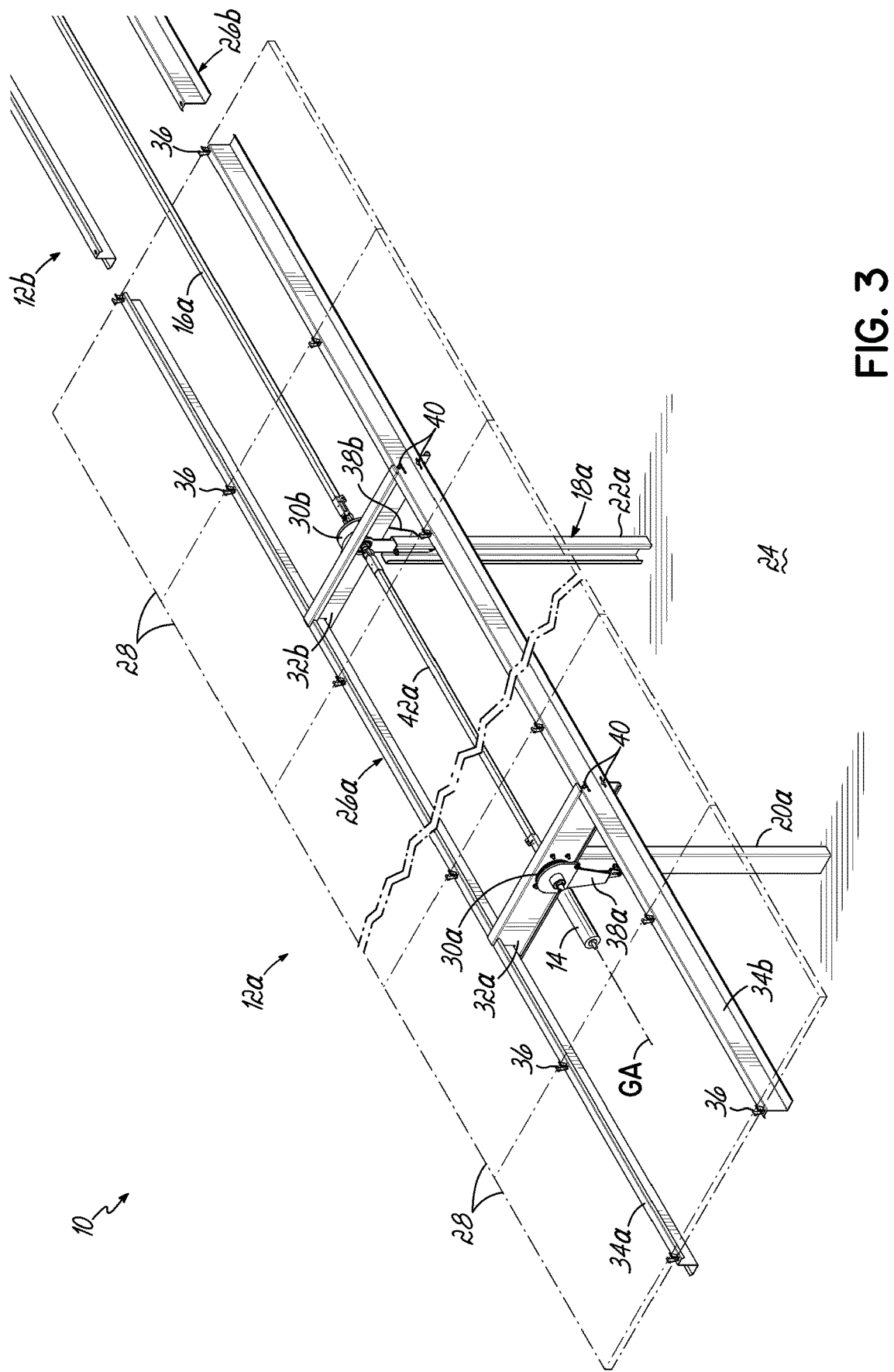
FIG. 3 is an enlarged perspective view of the modular tracker system of FIG. 1, focusing on a single table with the solar panels of the first table being shown in phantom.

As shown in FIG. 3, the frame 26a may include cross beams 32a-b and support beams 34a-b. In the exemplary embodiment shown, the first cross beam 32a is generally parallel to the second cross beam 32b, and the first support beam 34a is generally parallel to the second support beam 34b, however, other arrangements of cross beams 32a-b and support beams 34a-b are also envisioned. The cross beams 32a-b and support beams 34a-b may be attached to each other using an attachment structure, for example a fastener 40, such as a nut and bolt. The solar panels 28 may be attached to frame 26a, such as the first and second support beams 34a-b, using a variety of attachment structures, such as using clips 36, bolts, screws, or other suitable attachment structures.

As shown in FIGS. 2 and 3, the gearboxes 30a-d of the first and second tables 12a-b may be respectively supported by the first and second support structure 18a-b of the first and second tables 12a-b. More specifically, the gearboxes 30a-d may be operatively coupled to the first mounting post 20a-b and the second mounting post 22a-b of each of the first and second tables 12a-b. For example, as shown in FIG. 3, the first gearbox 30a may be coupled to the first mounting post 20a using a lever arm 38a and a first mounting bracket 116c (shown in FIG. 8), and the second gearbox 30b may be coupled to the second mounting post 22a using a lever arm 38b and a second mounting bracket 116b (shown in FIG. 9A). The mounting brackets 116a-b locate the spherical bearings 124a-b that mount the rotatable gearbox housings (i.e. the second outputs 50a-b), and the lever arms 38a-b prevent the non-rotatable gearbox housings 54a-b from rotating.

With continued reference to FIGS. 2 and 3, the modular tracker system 10 includes first and second intra-table drive shafts 42a-b. The first intra-table drive shaft 42a connects the first and second gearboxes 30a-b of the first table 12a to the frame 26a of the first table 12a, and the second intra-table drive shaft 42b connects the first and second gearboxes 30c-d of the second table 12b to the frame 26b of the second table 12b. As alignment within each of the first and second tables 12a-b is established by self-aligning the axes of the gearboxes 30a-b with the axis of rotation established by the centers of the spherical bearings mounting the two gearboxes 30a-b, using the first and second intra-table drive shafts 42a-b to coaxially connect the shafts of the two gearboxes 30a-b, alignment between the adjacent first and second tables 14a-b is corrected using the first inter-table drive shaft 16a using two universal joints 44 at the ends of the inter-table drive shaft 16a or by making the inter-table drive shaft 16a flexible enough (e.g. using flexible shaft 122) to deflect without inducing high bending loads. This is because the torque required to drive the gearboxes is very low, due to the very high gear ratio of the gearboxes 30a-b.

The modular tracker system 10 may be powered by a single motor 14. The single motor 14, as shown in FIG. 2, may be rotatably connected to the input of the first gearbox 30a, with the single motor 14 for imparting rotational motion to the first gearbox 30a, thereby causing the gearbox shaft to rotate within the gearbox 30a. The single motor 14 may be, for example, any type of device or method, either automatic or manual, for supplying rotational energy, such as: an electric, gas, solar or other type of energy powered motor, a manually operated crank, or any combination of these devices. For example, a 24 Volt DC geared motor having a max torque of 92 Newton meters, a rated torque of 46 Newton meters, and a rated speed of 10.3 rotations/ minute may be used, however, a variety of other suitable motors 14 are also suitable. The coupling of the single motor 14 to the modular tracker system 10 is simplified since the transmitted torque is relatively small. Concurrently, the torque carried by the drive shafts should never be higher than the torque provided by the motor 14, requiring a relatively light section to provide the required torque capacity.

For the solar panel platform 382 to effectively track the apparent path of the sun, a microcontroller (not shown) in electronic connection with the single motor 14. The microcontroller may be programmed to vary the angular velocity of the gearbox shaft 64 as needed, which in turn varies the angular velocity of the solar panel platform 382. Microcontrollers are well understood in the art, and as a result, are not described in detail below.

Figure 4A:
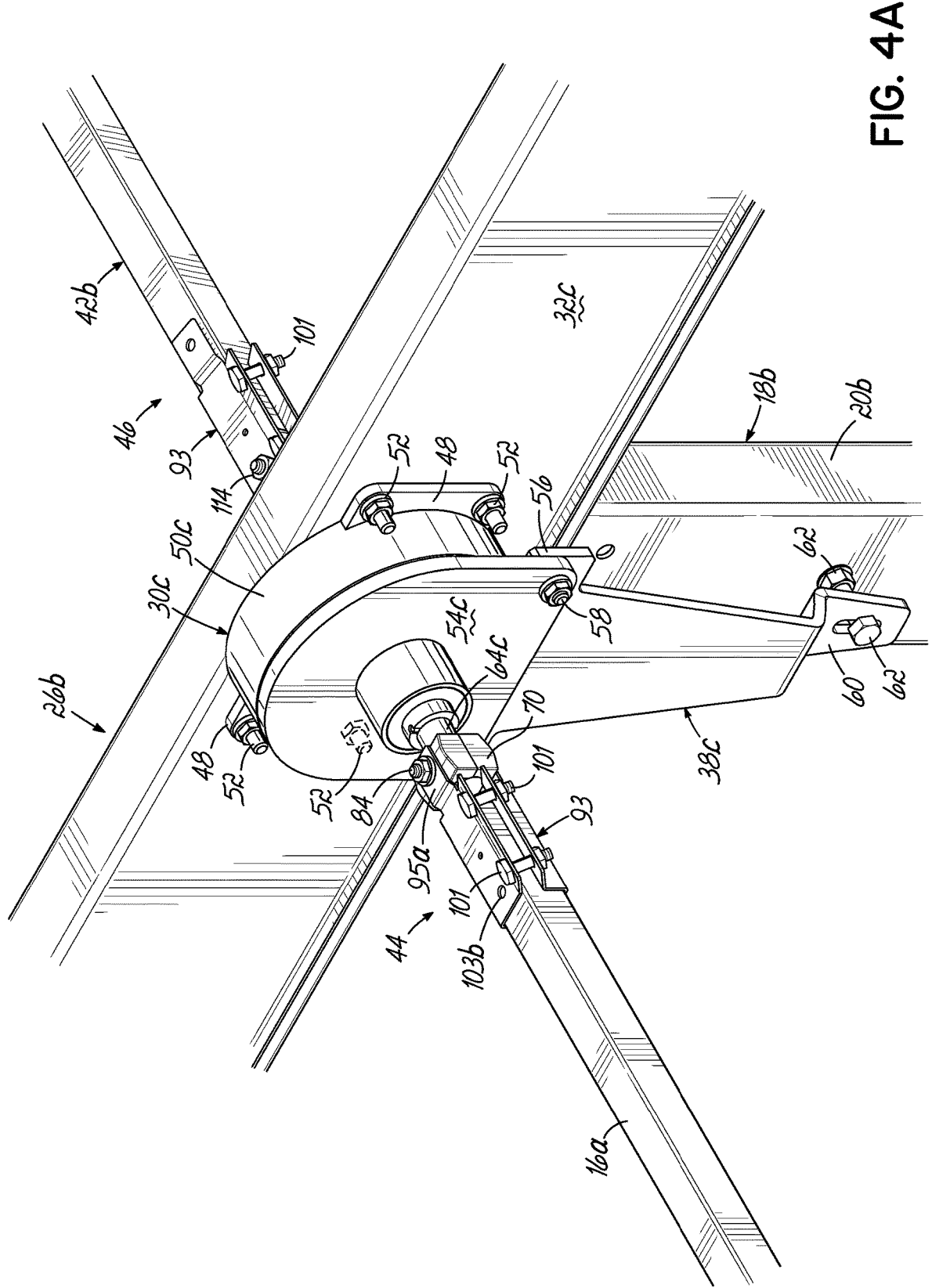
FIG. 4A is a detailed perspective view of the encircled portion 4A of FIG. 2 showing a universal joint coupling the first inter-table drive shaft to the first gearbox of the second table.
Figure 4B:
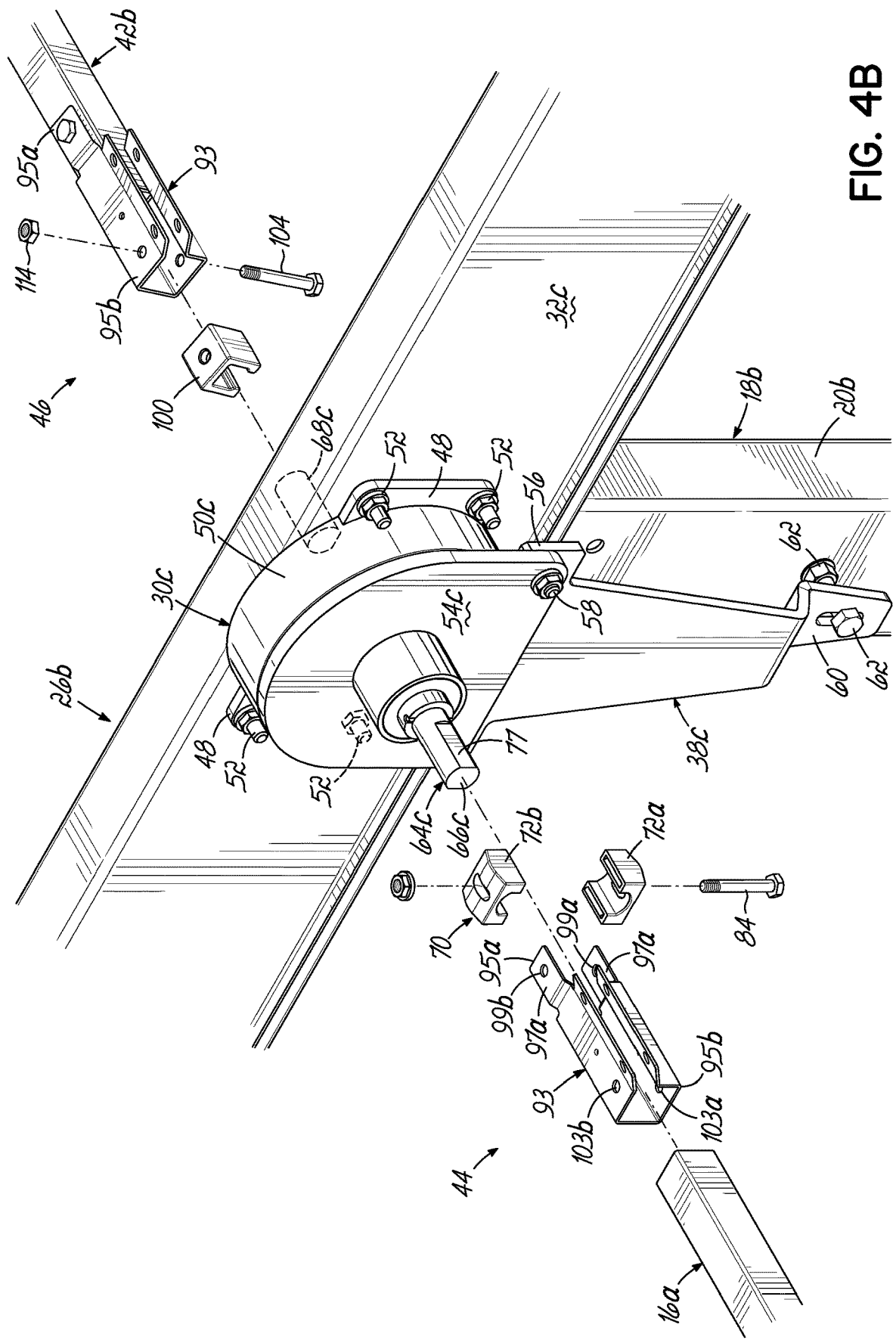
FIG. 4B is an exploded perspective view of FIG. 4A showing details of the universal joint.

FIGS. 4A and 4B show detailed perspective views of the third gearbox 30c of the second table 12b operatively coupled to the frame 26b. While the third gearbox 30c is described in detail, these principles apply equally to other gearboxes of other tables 12a-d, such as the first gearbox 30a, and the second gearboxes 30b, 30d, and subsequent gearboxes (not shown) for the third and fourth tables 12c-d. Description below is with respect to the third gearbox 30c and not the first gearbox 30a, since the first gearbox 30a, according to this exemplary embodiment, is coupled to the single motor 14 and not to an adjacent table.

Figure 5A:
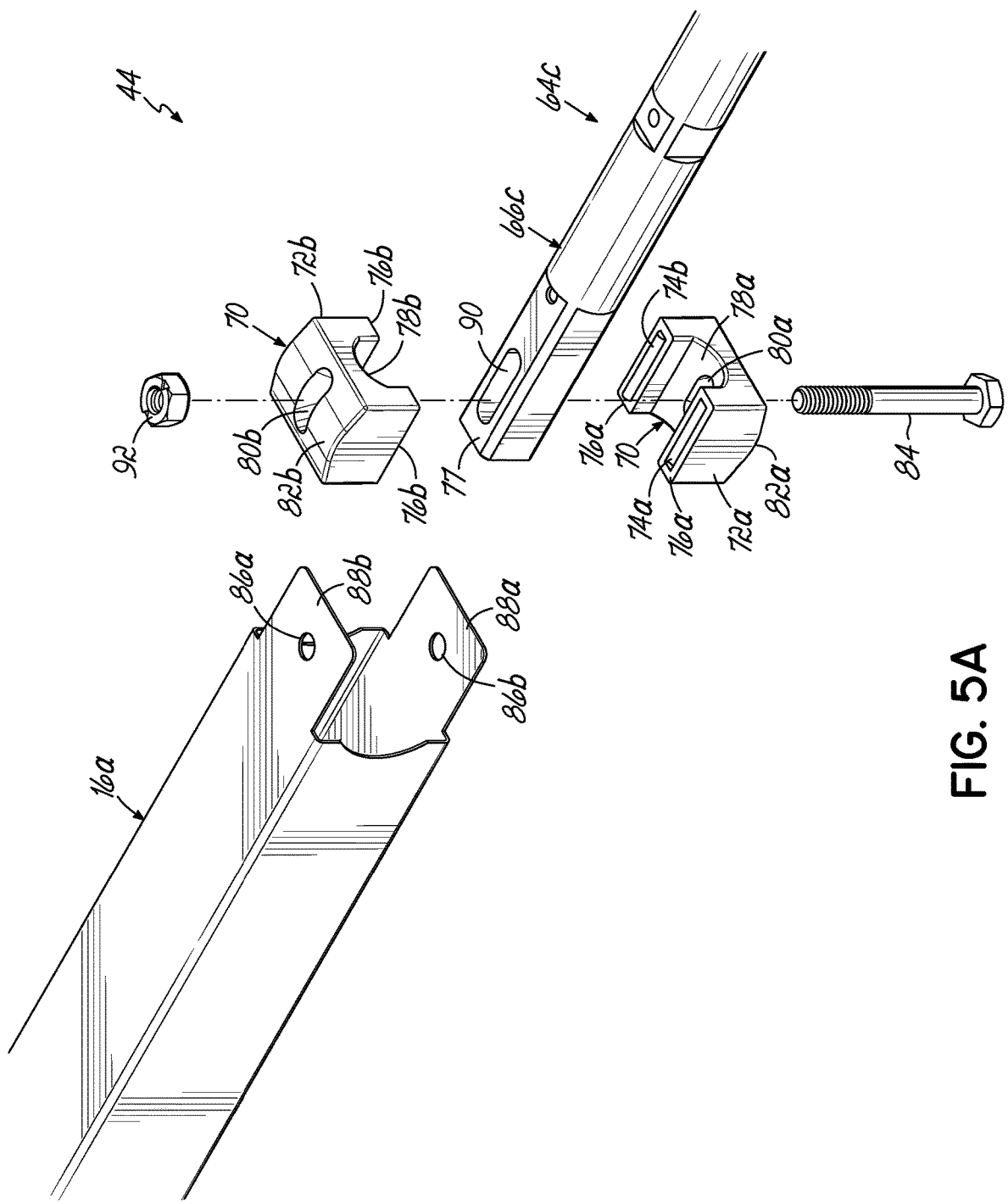
FIG. 5A is an exploded perspective view showing the universal joint of FIG. 4A.
Figure 5B:
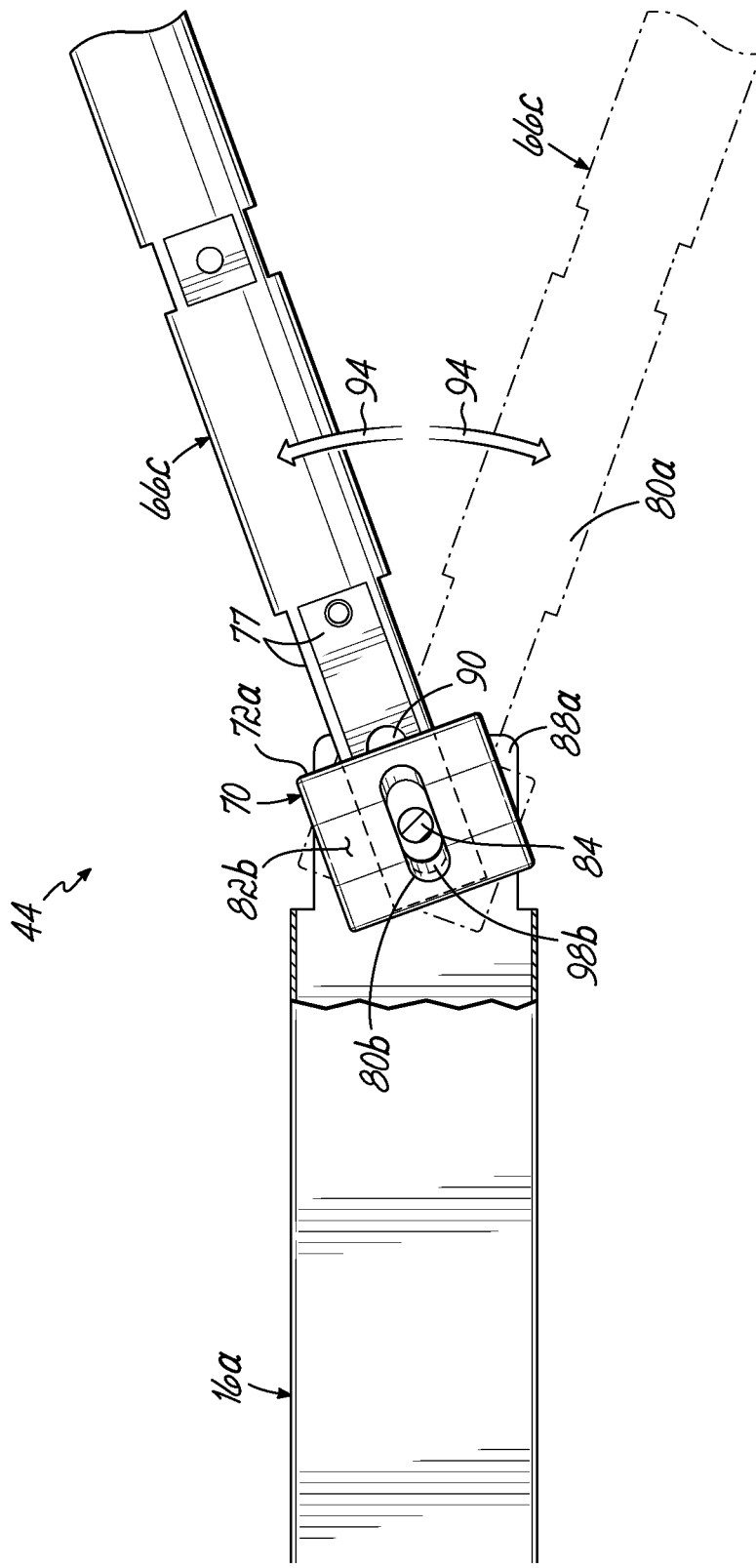
FIG. 5B is a top plan view partially broken away of the universal joint of FIG. 4A showing movement of the gearbox shaft in a first orthogonal direction.
Figure 5C:
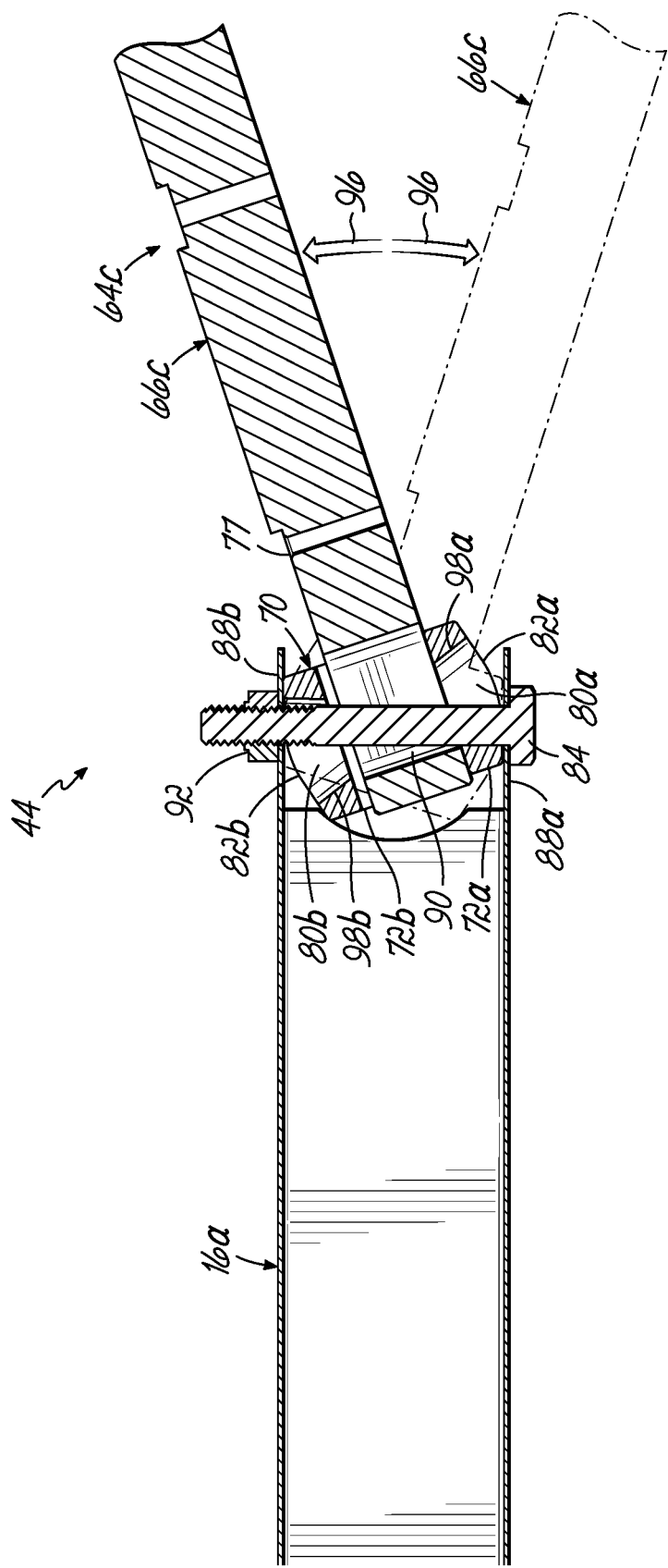
FIG. 5C is a side cross-sectional view of the universal joint of FIG. 4A showing movement of the gearbox shaft a second orthogonal direction.
Figure 6:
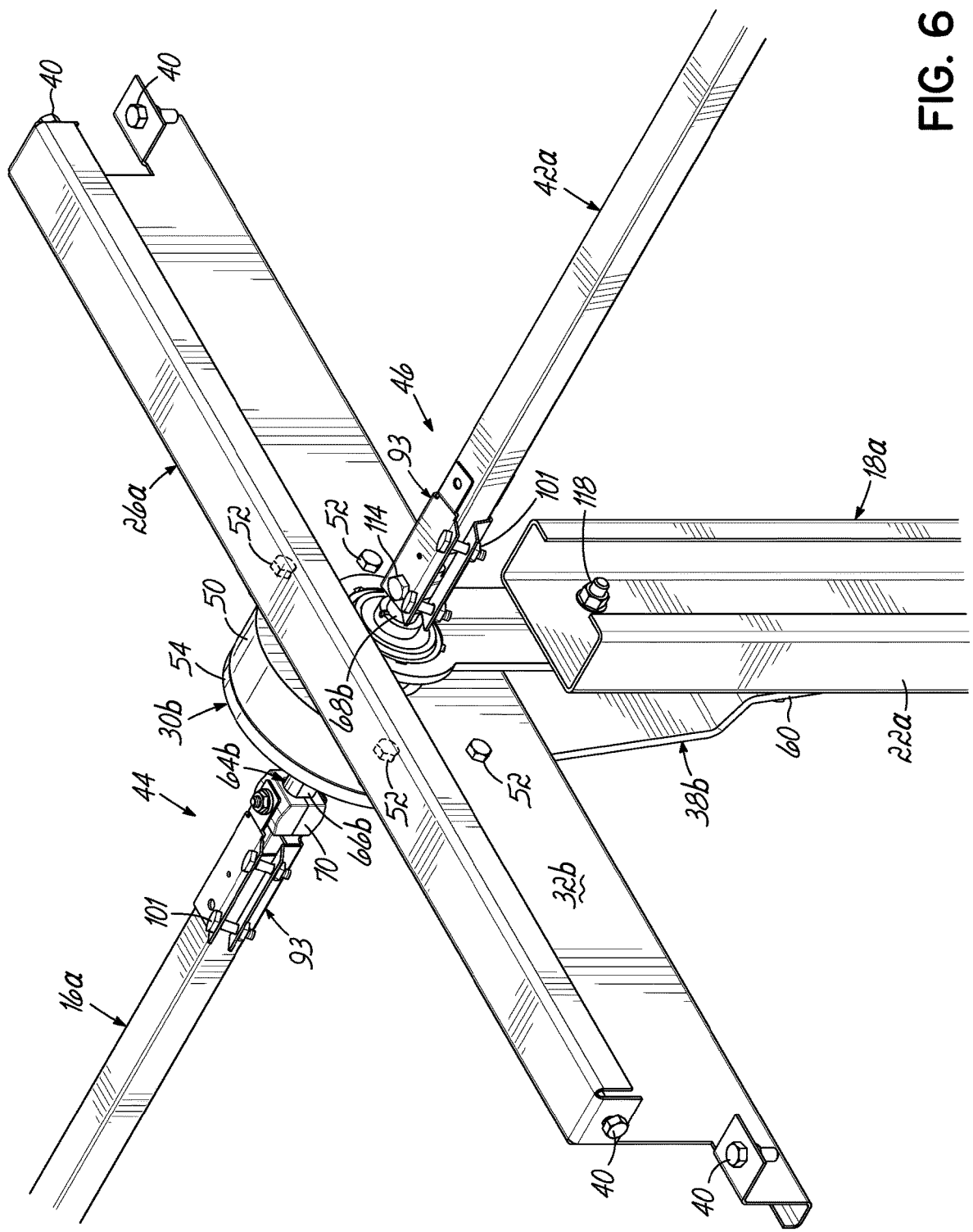
FIG. 6 is a detailed perspective view of the encircled portion 6 of FIG. 2 showing a rigid joint coupling a first intra-table drive shaft to a second gearbox of the first table.
Figure 7A:
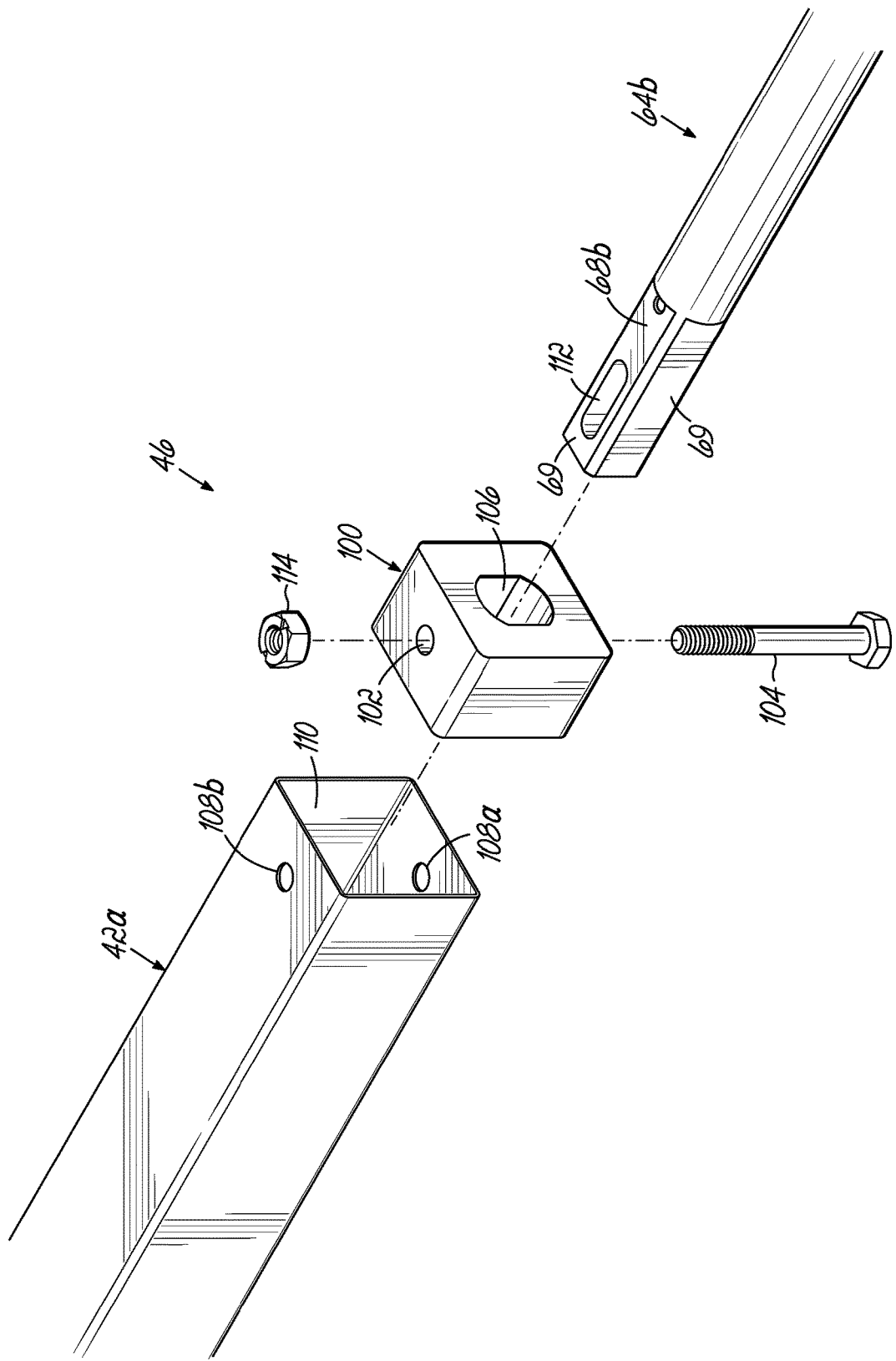
FIG. 7A is an exploded perspective view of the rigid joint of FIG. 6.
Figure 7B:
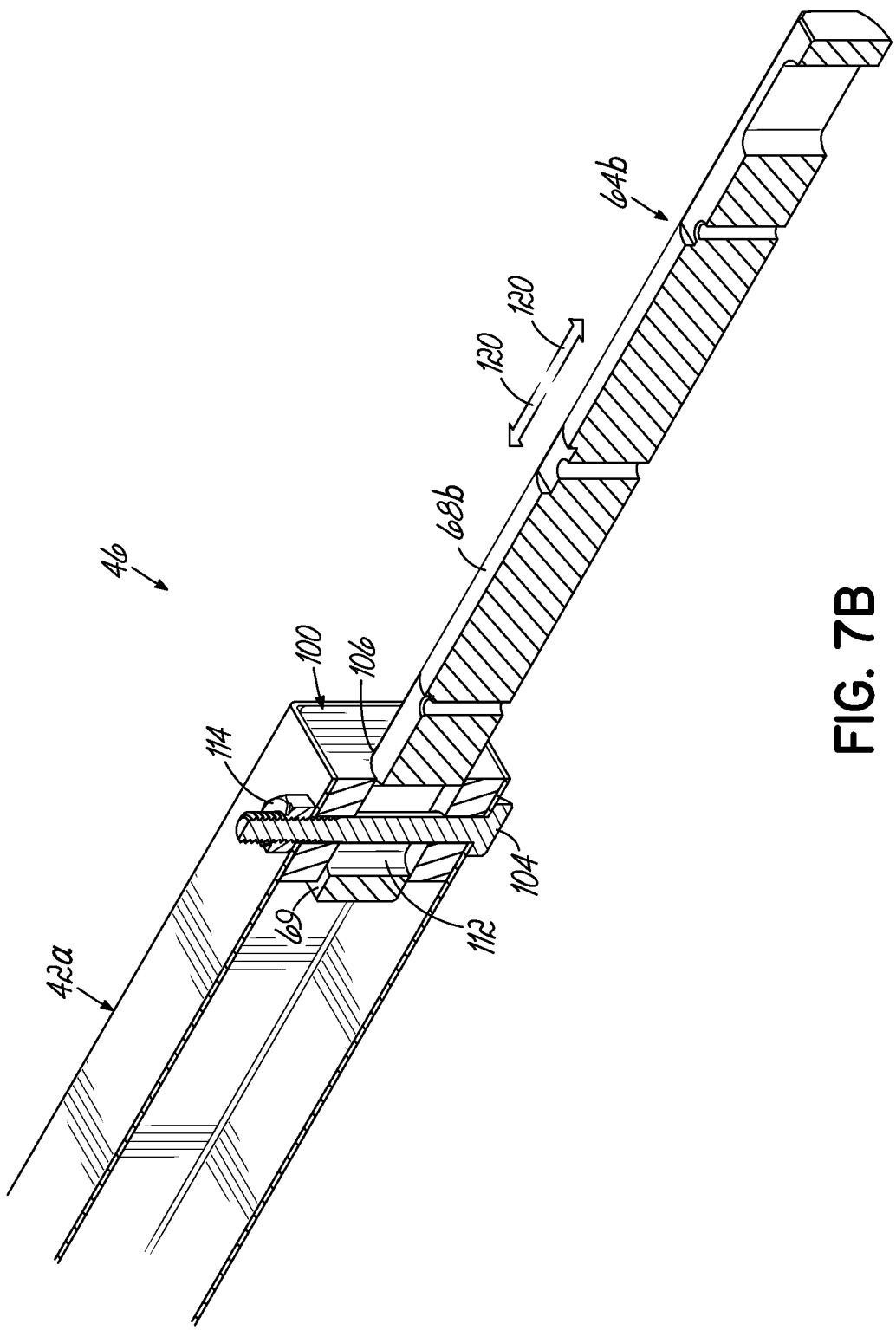
FIG. 7B is a cross-sectional perspective view of FIG. 7A.

The first inter-table drive shaft 16a is connected to the third gearbox 30c of the second table 12b using a universal joint 44, shown in greater detail with reference to FIGS. 5A-5C, and the second intra-table drive shaft 42b is connected to the first gearbox 30c using a rigid joint 46, shown in greater detail with reference to FIGS. 6, 7A and 7B. While universal joints 44 are shown as being used between tables (e.g. the first and second tables 12a-b) and rigid joints are shown as being used within a table (e.g. the first table 12a), a universal joint 44 may be used both within and between tables for simplicity (as shown in FIGS. 10A-B), and a rigid joint 46 may be used both within and between tables when a flexible inter-table drive shaft 122 (shown in FIG. 9) is used to accommodate misalignment.

As will be described in greater detail below, but introduced here for greater clarity, the third gearbox 30c includes a rotatable input housing 54c (FIG. 4A and FIG. 4B), a gearbox shaft 64c having an input 66c and a first output 68c, and a second output 50c, which is shown as a rotatable output housing. The input 66c of the gearbox shaft 64c may have cutout portions 77, and the first output 68c may have cutout portions 69. Once again, the principles described with respect to the third gearbox 30c, also apply to the other gearboxes 30a-d etc.

More specifically, the third gearbox 30c may provide two separate output rotational motions that are generated from imparting an input rotational motion from the single motor 14 to the input 66c of the gearbox shaft 64c: a rotational motion of the first output 68c of the gearbox shaft 64c, and a rotational motion of the second output 50c. The rotational motion of the first output 68c of the gearbox shaft 64c is generated due to the structural features of the gearbox, which enables the gearbox shaft 64c, which is disposed within the third gearbox 30c, to extend from the input 66c of the gearbox shaft 64c, positioned outside of the third gearbox 30c, to the first output 68c of the gearbox shaft 64c, also positioned outside of the third gearbox 30c. In short, the gearbox shaft 64c may extend all the way through the third gearbox 30c, preferably with the input 66c and the first output 68c of the gearbox shaft 64c extending outside of the third gearbox 30c as shown.

Instead of, or into addition to, the gearboxes 30a-d being coupled to the support structure 18a-b, the gearboxes 30a-d may also be respectively coupled to the first and second frame 26a-b. As shown, the first gearbox 30a may be attached to cross beam 32a of the frame 26a. As shown in FIGS. 4A and 4B, regarding the coupling of the third gearbox 30c to the frame 26c, the flange portion 48 of the second output 50c is operatively coupled to the cross-beam 32c using any suitable attachment structure, such as fastener 52, for example a nut and bolt. More specifically, the input 66c of gearbox shaft 64c extends away from the table 12c and the second output 50c of gearbox shaft 64c extends through an opening (not shown) within the cross-beam 32c and into an open space within the table 12c formed by the cross-beam 32c and the first mounting post 20b.

Similarly, the non-rotatable housing 54c may be coupled to an upper portion 56 of the first lever arm 38c of the second table 12b, using any suitable attachment structure, such as a fastener 58, for example a nut and bolt. Additionally, a lower end 60 of the first lever arm 38c is operatively coupled to the first mounting post 20b of the second table 12b using any suitable attachment structure, such as a fastener 62, for example a nut and bolt. As shown, the first lever arm 38c may have a bent shape to better accommodate the structure of the first mounting post 20b and first gearbox 30c and to provide greater flexibility for installation and operation.

Each gearbox 30a-d, with the second and third gearboxes 30b-c being shown and described for representative purposes, is configured to produce a first output 68b-c and a second output 50b-c. The first output 68b-c has a first rotational speed and the second output 50b-c has a second rotational speed that is less than the first rotational speed. The first output may have a first rotational speed equal to the input rotational speed. According to an exemplary embodiment, the first output 68b-c may have a speed ratio of about 1:1 and the second output 50b-c may have a speed ratio of about 1:60 or less. According to an embodiment, the gearbox reduction ratio is 1/361, and the row driven by one motor is 160 solar panels 28 long, resulting in the torque sustained by the gearbox lever arm being equal to the maximum torque load on four solar panels 28. The torque on the single motor 14 is 160/(4×361) or ⅑th of the torque already designed for which is the wind load from four solar panels 28. For example, there is no specific requirement to provide an additional rotational anchoring support for the single motor 14 when the first lever arm 38a is designed with a 10% capacity margin. The second outputs 50b-c of the second and third gearboxes 30b-c are operatively coupled to the respective frame 26b-c. The input 66b-c of the second and third gearboxes 30b-c may be formed on a common shaft as the first output 68b-c, resulting in the input 66b-c having the same speed ratio as the first output 68b-c.

Regarding the rotation of the frame 26c, the single motor 14 supplies rotational energy to the first table 12a and causes the first inter-table drive shaft 16a rotatably coupled to input 66c of the gearbox shaft 64c. The gearbox shaft 64c imparts rotational motion to the first output 68c, such that the rotational motion may be utilized to provide the rotational motion to other tables. Also, the second output 50c will rotate around corresponding drive shafts that are integral with a corresponding pair of gearboxes 30c-d, and due to the connection of the second output 50c to corresponding cross beams 32c-d, the frame 26b may rotate at the same angular velocity as the second output 50c. More specifically, due to the connection of the second output 50*c* to the frame 26*c* (e.g. cross beam 32*c*), the frame 26*c* may rotate around first and second mounting posts 20*b*, 22*b* at the same angular velocity as the second output 50*c* of the third gearbox 30*c*.

Now with reference to the universal joint 44 shown in greater detail with respect to FIGS. 5A-5C. According to an exemplary embodiment, the universal joint 44 includes a yoke 70 having first and second portions 72*a-b*. An alignment structure 74*a-b* is disposed on the connecting portion 76*a-b* to suitably align the first and second portions 72*a-b*. However, a yoke 70 integrally formed as a unitary piece is also envisioned. The first and second portions 72*a-b* each respectively include a cutout portion 78*a-b* sized to accommodate the input 66 extending therethrough. The first and second portions 72*a-b* each respectively include a through hole 80*a-b* disposed on an end surface 82*a-b*. The end surfaces 82*a-b* of the first and second portions 72*a-b* may be arcuately shaped, as will be discussed below.

With continued reference to FIGS. 5A-5C, the yoke 70 allows for connection between two shafts with an attachment structure. As shown, a fastener 84, such as a bolt, extends through the first through hole 86*a* of the first output arm 88*a* of the first inter-table drive shaft 16*a*, the first through hole 80*a* of the first portion 72*a*, the elongate slot 90 of the input 66 of the third gearbox 30*c*, the second through hole 80*b* of the second portion 72*b*, and the second through hole 86*b* of the second output arm 88*b* of the first inter-table drive shaft 16*a*. The fastener 84 may then be threadably coupled with a nut 92.

As shown in FIGS. 4A and 4B, the universal joint 44 may include a bracket 93 to couple the first inter-table drive shaft 16*a* with the input 66*c* of the third gearbox 30*c*. The bracket 93 may be reversible according to an exemplary embodiment. Using a reversible bracket 93 allows for fewer distinct parts, which may make installation simpler and cheaper. The bracket 93 includes first and second ends 95*a-b*. The first end 95*a* includes first and second legs 97*a-b*, with the first leg 97*a* including a first through hole 99*a*, and the second leg 97*b* including a second through hole 99*b*. The bracket 93 may be secured using an attachment structure, such as fasteners 101, for example nuts and bolts, in a flange portion of the bracket 93.

The fastener 84 may extend through the first through hole 99*a* of the first end 95*a* of the bracket 93, through the first through hole 86*a* of the first inter-table drive shaft 16*a*, through the hole of the yoke 70*a-b*, the elongate slot 90 of the gearbox shaft 64*c*, the second through hole 99*b* of the first inter-table drive shaft 16*a*, and through the second through hole 99*b* of the first end 95*a* of the bracket 93.

As shown, the bracket 93 may be reversible allowing the bracket 93 to be used for both the universal joint 44, shown in greater detail with reference to FIGS. 5A-5C, and the rigid joint 46, shown in greater detail with reference to FIGS. 6, 7A and 7B. More specifically, a first end 95*a* of the bracket 93 may be used for coupling the universal joint 44 to the respective structures, and a second end 95*b* may be used for coupling the rigid joint 46 to the respective structures. As shown, for example, the bracket 93 may be rotated 180° to couple the first output 68*c* of the third gearbox 30*c* to the second intra-table drive shaft 42*b*. The second end 95*b* of the bracket 93 includes first and second through holes 103*a-b*.

This arrangement allows torque to be suitably transferred, while the input 66 of the first gearbox 30*c* is free to rotate about two axes orthogonal to the axis of rotation of the first inter-table drive shaft 16*a*. As shown in the top view of FIG. 5B, the fastener 84 allows for the input 66 (e.g. the input connecting end) of the first gearbox 30*c* to rotate about first orthogonal plane, as shown by arrow 94. Additionally, the oppositely disposed end surfaces 82*a-b* of the first and second portions 72*a-b* being arcuately shaped allow for the end surfaces 82*a-b* to pivot on the first and second output arms 88*a-b* allowing for a range of rotation about a second orthogonal plane, that is perpendicular to the first orthogonal plane. Additionally, the elongate slot 90 of the input 66 allows for rotation, shown by arrow 96 in FIG. 5C, in both the first and second orthogonal planes and a range of axial motion, due to the elongate nature of the elongate slot 90, generally along the axis of rotation for accommodation of assembly tolerances and thermal displacements. The outwardly tapering walls 98*a-b* of the first and second through holes 80*a-b* allows for the yoke 70 to pivot about the fastener 84 for added flexibility.

As such, the universal joint 44 allows for accommodation of substantial misalignment between axes of adjacent tables (e.g. between the first and second tables 12*a-b* or between the second and third tables 12*b-c*) while also transmitting torque between two adjacent shafts that are not aligned. To accommodate uneven ground locations, it is desirable to have the universal joint 44 accommodate as much as 10 degrees of axial misalignment and a vertical misalignment of 12 inches, according to an exemplary embodiment. This allows the first inter-table drive shaft 16*a* to be in an angled orientation relative to the first and second tables 12*a-b*. In this manner, the first and second tables 12*a-b* may be secured in uneven ground or other surfaces, without impacting the operation of the modular tracker system 10 as described above. Other universal joints are also envisioned.

FIGS. 6, 7A and 7B show a detailed view of FIG. 2, where the second intra-table drive shaft 42*b* is connected to the second gearbox 30*b* using a rigid joint 46. The rigid joint 46 includes a spacer 100 that allows a hollow shaft, such as the second intra-table drive shaft 42*b*, to connect to a smaller shaft, such as the first output 68*b* of the second gearbox 30*b* for coaxial torque transfer. While the spacer 100 is shown as being integrally formed as a unitary piece, persons skilled in the art would appreciate that the spacer 100 may be collectively formed from distinct components.

With the rotating frame integrated self-aligning bearings mounting the gearbox to the mounting bracket, there is flexibility to accommodate position tolerances between the two mounting points of each gearbox (such as the second gearbox 30*b*), facilitating the tracker assembly process. As shown in FIG. 4A, the first mounting position may be using the flange portion 48 and/or lever arm 38*c*. As shown in FIG. 6, the second mounting position may be using the mounting bracket 116. In the horizontal direction, tolerances are built into the frame 26*a* that may have adjustability in the distance between the two pivot arms (cross beam 32*a-b* of the frame 26*a*).

With reference to exploded perspective views of FIGS. 7A and 7B, a rigid joint 46 is shown being connected between the first intra-table drive shaft 42*a* and the first output 68*b* of the second gearbox 30*b*. However, persons skilled in the art would appreciate this rigid joint is applicable to connections between respective intra-table drive shafts and gearboxes. The first intra-table drive shaft 42*a* at first end is rotatably connected to the input 66*a* of gearbox shaft 64*a* of the first gearbox 30*a*, and at the second end is rotatably connected to input 66*b* of the gearbox shaft 64*b* of the second gearbox 30*b*.

The spacer 100 includes a first through hole 102 to accommodate a fastener 104, such a bolt, therethrough and a second through hole 106 for the cutout portion 69 of the first output 68*b* to extend therethrough. The first intra-table drive shaft 42a is shown as being hollow and including first and second through holes 108a-b extending adjacent to the terminal end 110. The first output 68b includes an elongate slot 112 on the smaller shaft that allows for axial displacement (for assembly tolerances and thermal displacements). Once the fastener 104 extends through the second through hole 108b of the first intra-table drive shaft 42a, through the hole 102 of the spacer 100, the elongate slot 112 of the second gearbox 30b, and the second through hole 108b of the first intra-table drive shaft 42a, the fastener 104 may be secured with a nut 114. A portion of the second gearbox 30b may be supported by a mounting bracket 116b coupled to the second mounting post 22a using a connecting structure, such as a fastener 118, for example a nut and bolt. The elongate slot 112 on the gearbox shaft 64b allows for axial displacement (for assembly tolerances and thermal displacements) as shown by arrow 120.

As previously described, a bracket 93 may also be included as part of the rigid joint 46. The bracket 93 has a first end 95a and a second end 95b disposed opposite the first end 95a, where the second end 95b includes first and second through holes 103a-b. The fastener 104 may extend through the first through hole 103a of the second end 95b of the bracket 93, the first through hole 108a of the first intra-table drive shaft 42a, the first through hole 102 of the spacer 100, the elongate slot 112 of the gearbox shaft 64b of the second gearbox 30b, the second through hole 108b of the first intra-table drive shaft 42a, and through the second through hole 103b of the second end 95b of the reversible bracket 93. The fastener 104 may be secured with a nut 114. The bracket may be secured on a side using a fastener 101, such as a nut and bolt.

Figure 8:
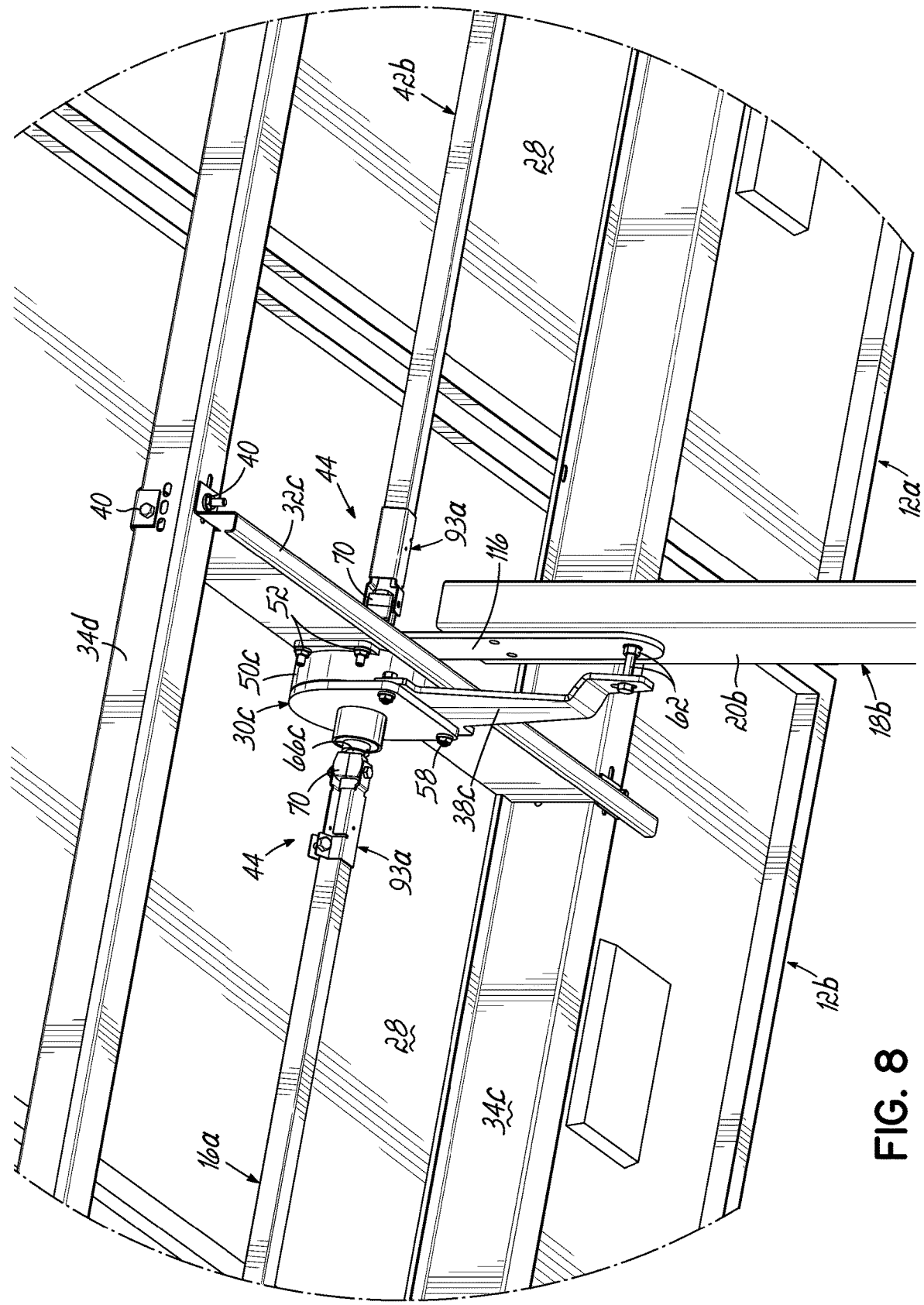
FIG. 8 is a bottom perspective view of two universal joints.

In FIG. 8, two universal joints 44 are shown, each using an alternative bracket 93a including a single fastener 101. The first universal joint 44 couples the first inter-table drive shaft 16a to the input of the third gearbox 30c and includes a bracket 93a, that functions in a similar manner to bracket 93 described above. The second universal joint 44 couples the first output 68c to the second inter-table drive shaft 42b and includes a bracket 93a.

Figure 9:
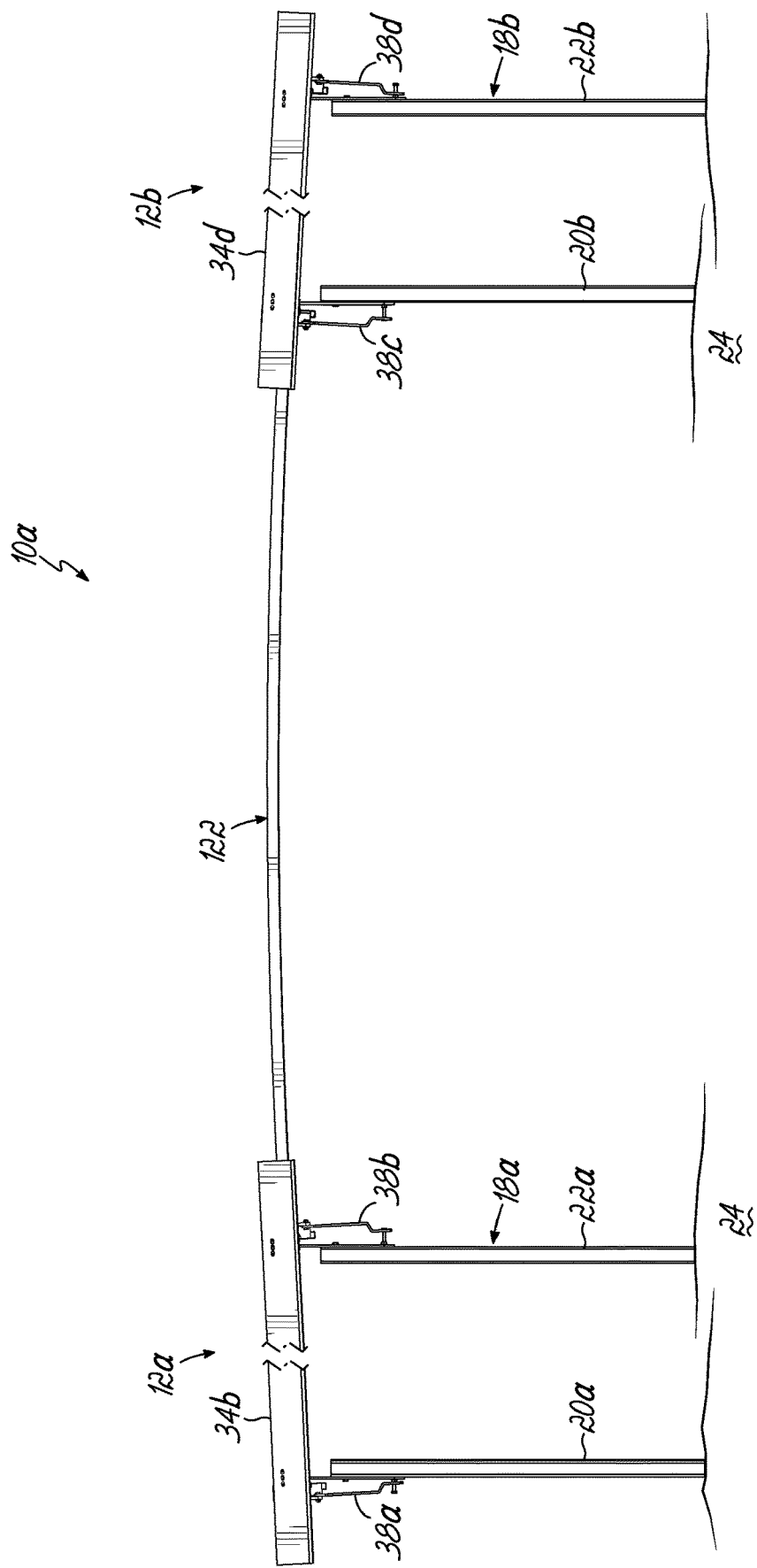
FIG. 9 is a side view of a flexible drive shaft coupling the first and second tables together.
Figure 9A:
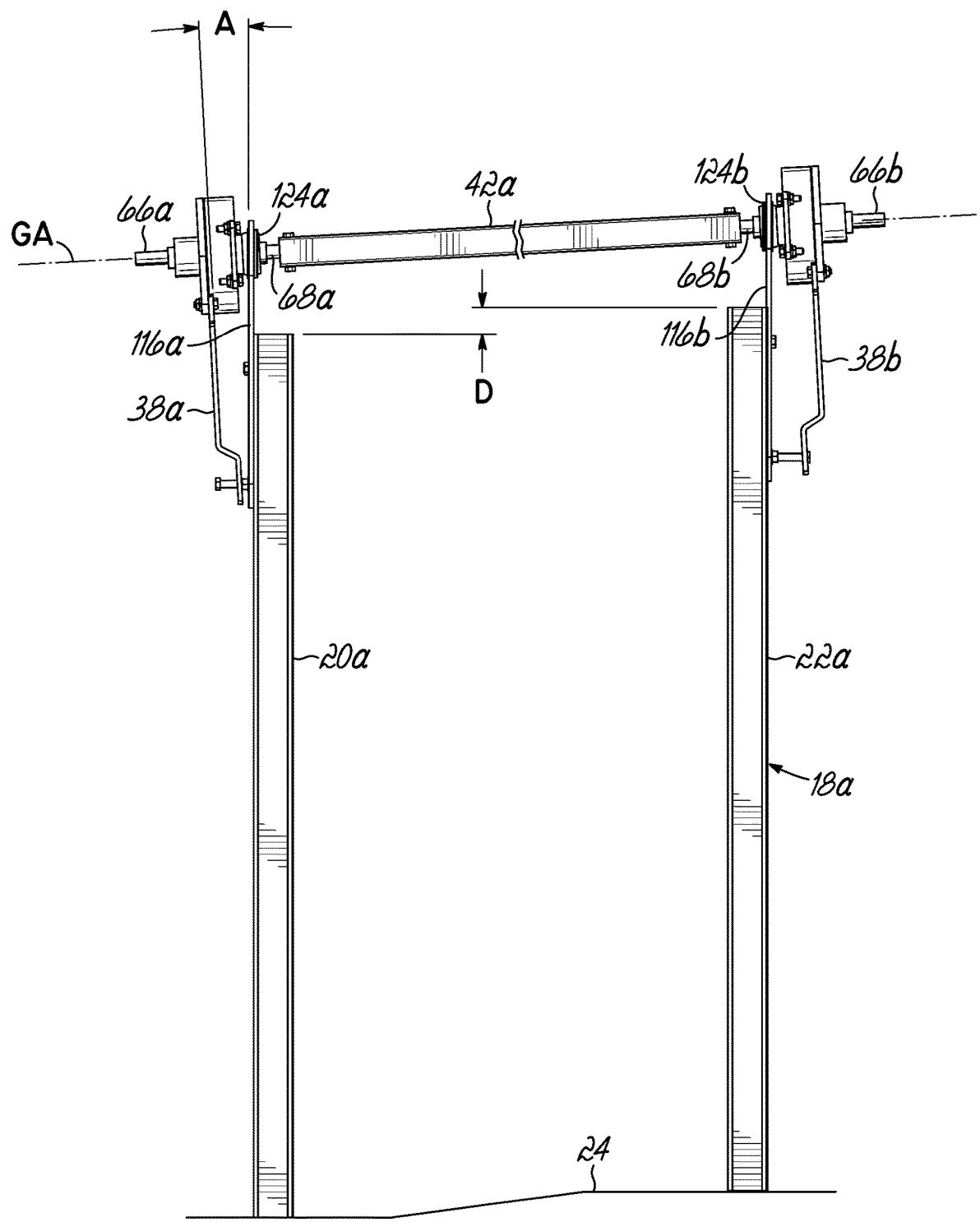
FIG. 9A is an enlarged view of the first table of FIG. 9.
Figure 10A:
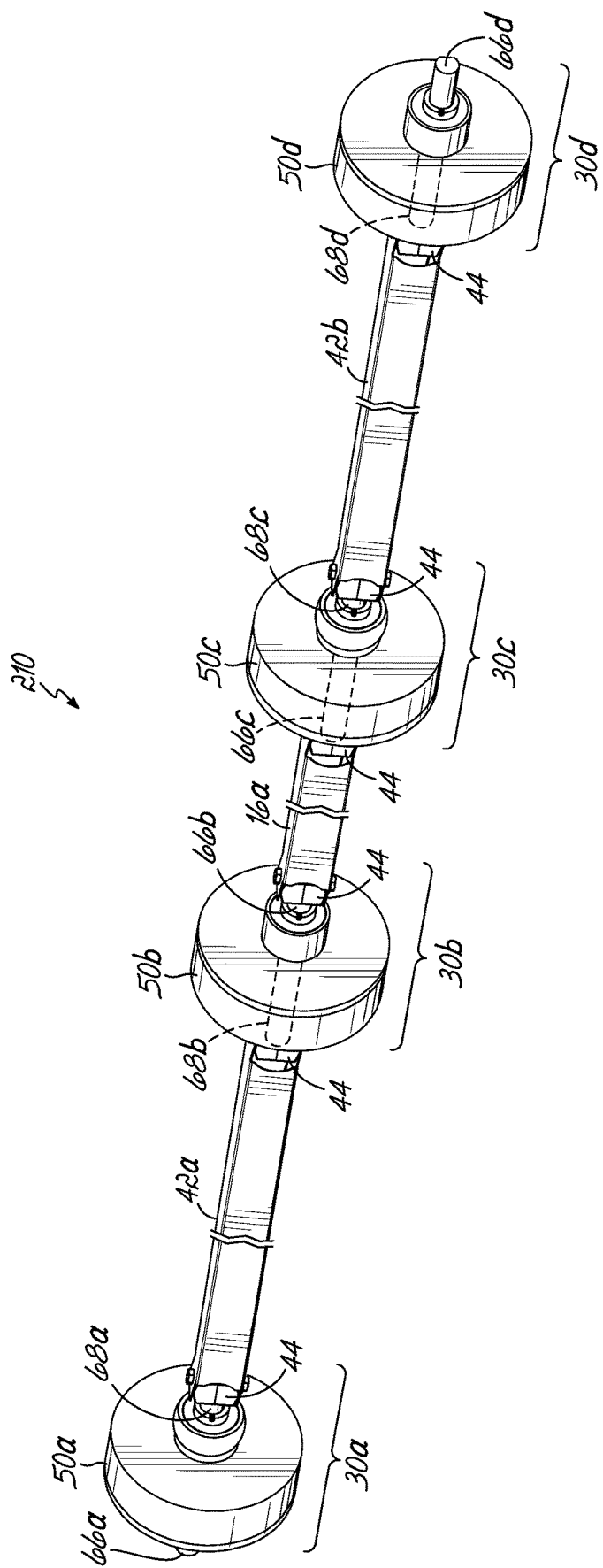
FIG. 10A is a front perspective view of a gearbox system according to another exemplary embodiment, removed from the modular tracker system 10 of FIG. 2.
Figure 10B:
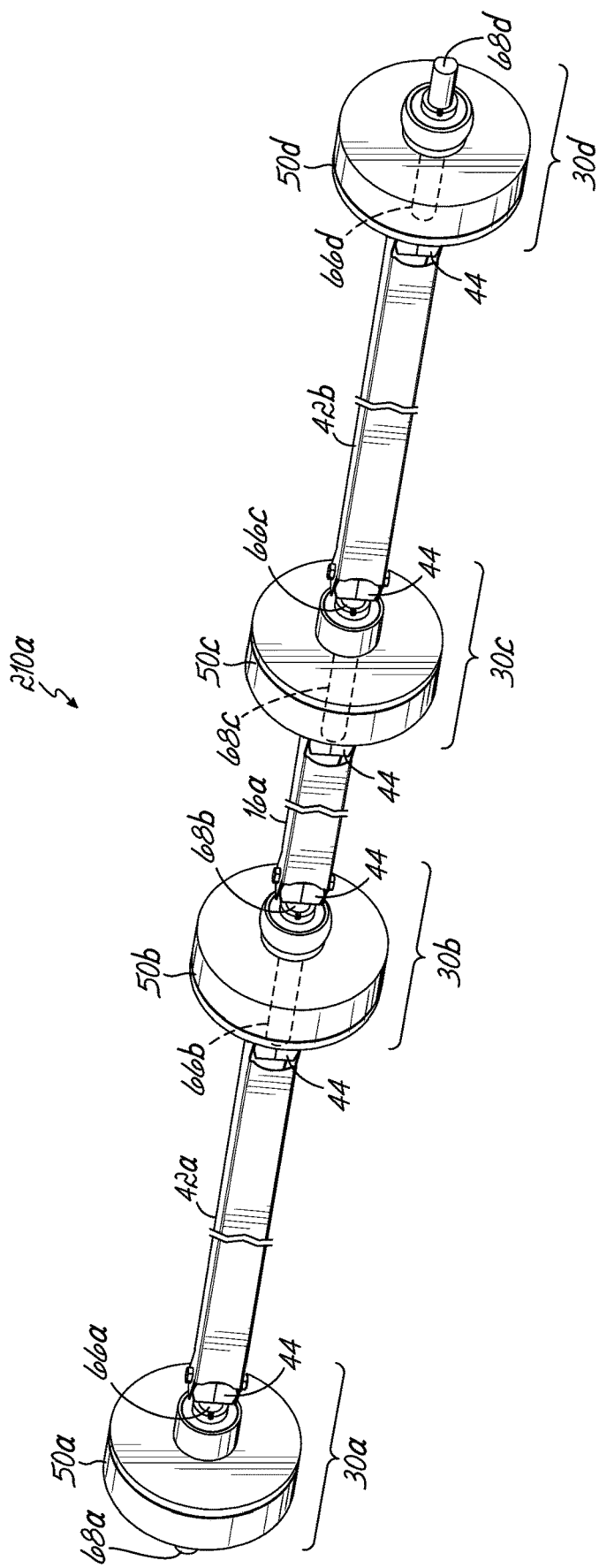
FIG. 10B is a front perspective view of a gearbox system according to another exemplary embodiment.

Now with reference to FIG. 9, which shows a flexible shaft 122 in accordance with another exemplary embodiment, which may be used instead of, the universal joint 44, and the rigid joint 46. While the flexible shaft is shown in place of the first inter-table drive shaft 16a, persons skilled in the art would appreciate this flexible shaft 122 may be used instead of the intra-table drive shaft 42a-d and/or the inter-table drive shaft 16a-c. For example, a square 0.75 inch tubular flexible shaft having a wall thickness of 0.06 inches and a length of 9 feet will deflect less than 6 degrees with minimal inducement of bending stresses, while carrying a torque capable of driving more than 20 gearboxes, such as gearboxes 30a-d.

The flexible shaft 122 generally has a smaller cross-sectional area than the inter-table drive shaft 16a, allowing the flexible shaft 122 to suitably flex such that misalignment corrects itself through the flexing in the flexible shaft 122. In this embodiment, the flexible shaft 122 is still strong enough to carry the torque load, but flexible enough to accommodate misalignment by bending. The flexible shaft 122 may be rigidly connected at both ends, such that it does not include articulating parts that wear and may need lubrication, such as the parts composing universal joints 44 and other non-rigid joints 46.

FIG. 9A shows an enlarged portion of the first table 12a of FIG. 9, with the second support beam 34b being removed for added clarity. Inaccuracies of angular orientation of the mounting posts 20a-d, 22a-d and discrepancies in the vertical position of the mounting posts 20a-d, 22a-d for each table 12a-b may be dealt with by the self-aligning spherical bearings 124a-b at two support points of each table 12a-b that allow the axis a range of freedom. As shown, the first and second gearboxes 30a-b are rotationally supported on the input 66a-b side by first and second lever arms 38a-b. Similarly, the first and second gearboxes 30a-b are supported on the first output 68a-b side by spherical bearings 124a-b free to rotate. As such, the first and second gearboxes 30a-b may be rotated on the spherical bearings 124a-b to obtain axial alignment for gearboxes on the same table (for example, the first and second gearboxes 30a-b as shown). However, these principles apply to other gearboxes (such as the first and second gearboxes 30c-d of the second table 12b and so on). The spherical bearings 124a-b allow the first and second gearboxes 30a-b, for example, that are attached to the frame 26a to remain co-axially aligned regardless of the position of the mounting point (center of the spherical bearings 124a-b). This allows for a wide range of tolerances in installation where the mounting posts 20a, 22a have loose tolerances in x-y-z reference frame.

As such, the modular tracker system 10 may prevent induced loads on the rotating frame 26a-b resulting from mounting post 20a-d, 22a-d misalignment due to different elevations (D) and angles (A). In addition, the rotating structures are sufficiently small so that any thermal deformation is easily manageable, in contrast with a single long stiff torque tube. The short distance between the spherical bearings 124a-b and the mounting to the pivot arm reduces the bending load induced by the forces applied through the support on the bearing points.

FIG. 10A shows an exemplary gearbox system 210, which is removed from the modular tracker system 10 shown in FIG. 2. The description below provides additional description as to how the first and second tables 12a-b may be rotated synchronously. As shown, the gearbox system 210 includes four gearboxes, namely, the first, second, third and fourth gearboxes 30a-d.

As shown, the first gearbox 30a starts with an input 66a that may be coupled to the single motor 14 and produces a first output 68a and a second output 50a. The first output 68a may be connected to the first intra-table drive shaft 42a using a universal joint 44, and the second output 50a may be operatively coupled to the frame 26a (not shown) to rotate the solar panels 28 of the first table 12a. The second gearbox 30b includes an input 66b obtained from the first intra-table drive shaft 42a through a universal joint 44 and produces a first output 68b and a second output 50b. The first output 68b may be connected to an inter-table drive shaft 16a using a universal joint 44, and the second output 50b may be operatively coupled to the frame 26a of the first table 12a to rotate the solar panels 28 of the first table 12a.

Similarly, the third gearbox 30c includes an input 66c that may be obtained from first inter-table drive shaft 16a through the universal joint 44. The third gearbox 30c produces a first output 68c and a second output 50c. The first output 68c may be connected to a second intra-table drive shaft 42b using a universal joint 44, and the second output 50c may be coupled to the frame 26b of the second table 12b to rotate solar panels 28 of the second table 12b. The fourth gearbox 30d includes an input 66d obtained from the second intra-table drive shaft 42b through a universal joint 44 and may produce a first output 68d and a second output 50d. The first output 68d may be connected to a second inter-table drive shaft 16b using a universal joint 44, and the second output 50*d* may be coupled to the frame 26*b* of the second table 12*b* to rotate the solar panels 28 of the second table 12*b*.

It should be understood that the reference to the "input" 66*a-d* and "first output" 68*a-d* of the gearbox shaft 64*a-d* and to all other similar designations, such as: input rotatable housing 312, second output 50*a-d*, input bearing housing enclosure, and output bearing housing enclosure, are merely arbitrary conventions that have been followed in order to accurately describe the gearbox 30*a-d* and the manner of its operation.

With this in mind, FIG. 10B shows an alternative gearbox system 210*a*, where each of the gearboxes 30*a-d* is rotated 180 degrees. The first and second gearboxes 30*a-b* and/or the third and fourth gearboxes 30*c-d* may operate symmetrically in that single motor 14 may be rotatably connected to either the input 66*a* of gearbox shaft 64, as described above, or connected to the opposite first output 68*a* of gearbox shaft 64, without in any manner altering the performance characteristics of the first gearbox 30*a* described above. Thus, when the single motor 14 may be connected to the first output 68*a* of the gearbox shaft 64, with the second output 314 prevented from rotating, the input rotatable housing 312 may rotate, just like the second output 314 may rotate when the single motor 14 may be rotatably connected to the input 66*a* of gearbox shaft 64.

As shown, the first gearbox 30*a* includes a first output 68*a* that may be coupled to the single motor 14 (not shown) and a second output 50*a*. The second output 50*a* may be operatively coupled to the frame 26*a* (not shown) to rotate the solar panels 28 of the first table 12*a*. The input 66*a* may be connected to the first intra-table drive shaft 42*a* using the universal joint 44. The second gearbox 30*b* includes a first output 68*b* obtained from the first intra-table drive shaft 42*a* through a rigid joint 46 and produces a first output 68*b* and a second output 50*b*. The second output 50*b* may be coupled to the frame 26*a* of the first table 12*a* to rotate the solar panels 28 of the first table 12*a*. The input 66*a* may be connected to an inter-table drive shaft 16*a* using a universal joint 44. While, FIGS. 10A and 10B show universal joints 44, rigid joints 46 may alternatively be used if desirable.

Similarly, the third gearbox 30*c* includes a first output 68*c* obtained from first inter-table drive shaft 16*a* through the universal joint 44 and a second output 50*c*. The second output 50*c* may be coupled to the frame 26*b* of the second table 12*b* to rotate solar panels 28 of the second table 12*b*. The input 66*c* may be connected to a second intra-table drive shaft 42*b* using a rigid joint 46. The fourth gearbox 30*d* includes a first output 68*d* obtained from the second intra-table drive shaft 42*b* through a rigid joint 46 and produces a first output 68*b* and a second output 50*d*. The second output 50*d* is coupled to the frame 26*b* of the second table 12*b* to rotate the solar panels 28 of the second table 12*b*. The input 66*d* may be connected to a second inter-table drive shaft 16*b* using a universal joint. As such, the first and second gearboxes 30*a-b* of the first table 12*a* and the third and fourth gearboxes 30*c-d* of the second table 12*b* operate symmetrically.

Figure 3A:
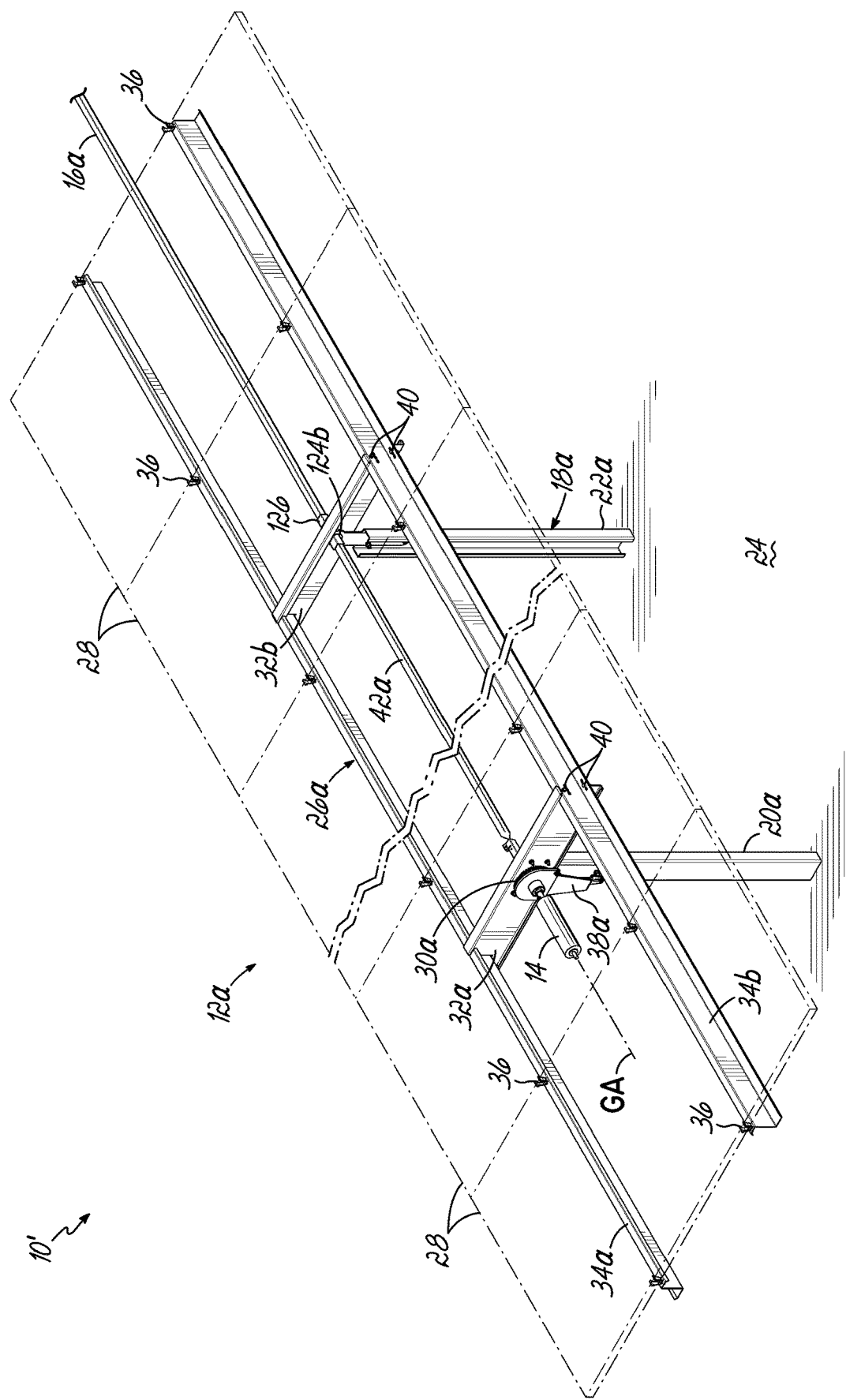
FIG. 3A is a perspective view of a table with a single gearbox in accordance with an alternative embodiment.

Now with reference to an alternative embodiment of the modular tracker system 10' shown in FIG. 3A, where the first table 12*a* includes a single gearbox 30*a*. While the first and second tables 12*a-b* shown in the FIG. 2 respectively include a second gearbox 30*b*, 30*d* operatively coupled to the second mounting post 22*a-b*, a second gearbox 30*b*, 30*d* is not always required. Instead, as shown in FIG. 3A, the first table 12*a* may include only a single gearbox (e.g. the first gearbox 30*a*), and the second table 12*b* may include only a single gearbox (e.g. the first gearbox 30*c*). As shown in FIG. 3A, when the second gearbox 30*b* is not present, a spherical bearing 124*b* may be used to mount the rotating frame 26*a* (not shown) to the second mounting post 22*a-b* when the support structure includes first and second mounting posts 20*a*, 22*a*. In addition, an opening through the spherical bearing 124*b* accommodates the drive shaft 42*a*. Through that opening, a bearing supported shaft 126 (shown schematically without couplings in FIG. 3A), similar to the gearbox shaft, would be mounted to provide a torque carrying connection between intra-table drive shaft 42*a* and the inter-table drive shaft 16*a*.

Figure 10C:
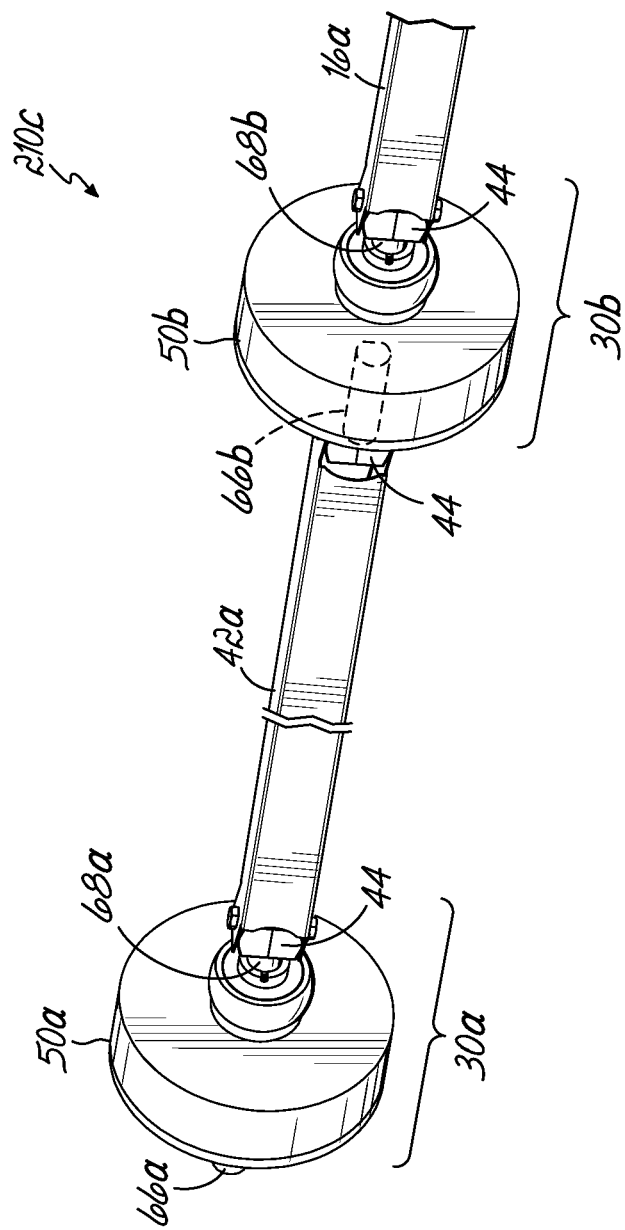
FIG. 10C is a front perspective view according to another exemplary embodiment, where the first output of the first gearbox is connected to the input of a second gearbox using a drive shaft.

While FIGS. 10A and 10B are described above with respect to first and second tables 12*a-b*, this also applies to a continuous modular tracker system that is not broken down into discrete tables, where the gearbox system 210*c* is shown in FIG. 10C. Like the previously disclosed embodiments shown in the Figures, the modular tracker system would include a support structure configured to be mounted in the ground, a frame supported by the support structure, a plurality of solar panels supported by the frame, first and second gearboxes 30*a-b*, a single motor driving the modular tracker system, and a drive shaft 42*a* connecting the first and second gearboxes 30*a-b*. The first gearbox 30*a* is supported by the support structure and defines an axis of rotation. The first gearbox 30*a* is configured to produce first and second outputs 68*a*, 50*a*. The first output 68*a* has a first rotational speed and the second output 50*a* has a second rotational speed that is less than the first rotational speed. The second output 50*a* is operatively coupled to the frame. The second gearbox 30*b* is supported by the support structure and axially aligned with the first gearbox 30*a* along the axis of rotation. The second gearbox 30*b* is configured to produce first and second outputs 68*b*, 50*b*. The first output 68*b* has the first rotational speed and the second output 50*b* has the second rotational speed and is operatively coupled to the frame. The drive shaft 42*a* couples the first output 68*a* of the first gearbox 30*a* with the input or output of the second gearbox 30*b*, whereby the plurality of solar panels is rotated synchronously.

Additional gearboxes and drive shafts may be included, such as third and fourth gearboxes (which may be the first and second gearboxes 30*c-d* of the second table 12*b*) and second and third drive shafts (which are shown as the first inter-table drive shaft 16*a* and the second intra-table drive shaft 42*b* in FIGS. 10A-B). The third gearbox 30*c* is supported by the support structure and axially aligned with the first gearbox 30*a* along the axis of rotation (GA). The third gearbox 30*c* is configured to produce first and second outputs 68*c*, 50*c*, where the first output 68*c* has the first rotational speed and the second output 68*c* has the second rotational speed that is less than the first rotational speed, and where the second output 50*c* is operatively coupled to the frame. The fourth gearbox 30*d* is supported by the support structure and is axially aligned with the third gearbox 30*c* along the axis of rotation. The fourth gearbox 30*d* is configured to produce first and second outputs 68*d*, 50*d*, where the first output 68*d* has the first rotational speed and the second output 50*d* has the second rotational speed and is operatively coupled to the frame. The second drive shaft, for example the first inter-table drive shaft 16*a*, connects the second and third gearboxes 30*b*-30*c*. The third drive shaft, for example the second intra-table drive shaft 42*b*, couples the input 66*b* of the second gearbox 30*b* with the input 66*c* of the third gearbox 30*c*. The third drive shaft connects the third and fourth gearboxes 30*c-d*. The third drive shaft couples the first output 68*c* of the third gearbox with the first output 68d of the fourth gearbox 30d, whereby the plurality of solar panels are rotated synchronously.

FIG. 11 shows an exemplary modular tracker system 10b that includes five tables 12a-e coupled together in a row. Additional tables may be added, as persons skilled in the art would appreciate. As shown, the modular tracker system 10b includes at least first, second, third, fourth, and fifth tables 12a-e rotatably arranged in a row, a single motor 14 driving the tables 12a-e, a first inter-table drive shaft 16a connecting the first and second tables, and a second inter-table drive shaft 16b connecting the second and third tables, and a third inter-table drive shaft 16c connecting the third and fourth tables 12c-d, and a fourth inter-table drive shaft 16d connecting the fourth and fifth tables 12d-e.

Each of the tables 12a-e respectively includes a first mounting post 20a-e and a second mounting post 22a-e configured to be mounted in the ground, a frame 26a-e supported by the first and second mounting posts, 20a-e, 22a-e, intra-table drive shafts 42a-e, and gearboxes 30a-j defining an axis of rotation. As shown, the frames 26a-e respectively include cross beams 32a-j and support beams 34a-j. Each gearbox 30a-j may be configured to produce first and second outputs, where the first output has a first rotational speed and the second output has a second rotational speed that is less than the first rotational speed, and where the second output may be operatively coupled to the frame 26a-e. The modular tracker system 10 also includes first, second, third, fourth and fifth intra-table drive shafts 42a-e. The first intra-table drive shaft 42a connects the first and second gearboxes 30a-b of the first table 12a to the frame 26a.

The modular tracker system 10, 10a, 10b provides many benefits, such as: (1) load distribution, (2) improved gear ratios, (3) simple assembly and installation, (4) improved alignment/tracking, (5) reduced sensitivity to thermal issues, and (6) reduced sensitivity to frequency issues. Each of these associated benefits is discussed below.

In terms of load distribution, the modular tracker system 10 allows for the torque loads and the bending loads sustained by different members, so that the structure may be optimized for both without inefficiencies. The high reduction ratio of the gearboxes result in a low torque load on the drive shafts, and allows a long row of tables 12a-e to be driven by a single motor 14. The decoupling of torsional loads handled by the gearboxes 30a-d, from the bending loads handled by the frame 26a-e allows for a higher efficiency of material used to meet the structural requirements. Decomposing a long row of photovoltaic modules into modular tables circumvents concerns with thermal displacements and low resonant frequencies. In addition, the modular tracker system 10 being broken down into tables 12a-e may better prevent inadequacies resulting from ground undulations, thermal displacements, and low resonant frequencies that torque tube designs do not adequately address. The torque loads developed by tables 12a-e, being relatively small in comparison to the modular tracker system 10, are small enough that the rotating frames of the modular tracker system 10 may be driven by bending load requirements, and optimized in terms of material usage.

According to an exemplary embodiment describing five tables 12a-e, driving the rotation of the tables 12a-e with a high gear ratio, typically over 1:300, using inter-table drive shafts 16a-e and intra-table drive shafts 42a-d allows solar panels 28 to suitably track the sun. The modular tracker system 10 allows for a very low torque requirement on the drive shafts, and a conversely very low sensitivity of the tables to torsional defection of the drive shaft. The modular tracker system 10 allows for much longer rows of tables driven by a single motor 14, reducing the motor 14 and microcontroller cost burden on each table 12a-e and resulting in a lower overall cost.

The modular tracker system 10 table based configuration is very simple and easy to assemble, since the gearbox may integrate bearings that support the table on the axis of rotation, and the complete structure may be reduced to few components, such as the support structure, gearboxes, frame. One additional advantage of breaking up the installation into small tables is that assembly is simpler and does not require expensive machinery to use and operate to lift components. Instead, given the modular design, components are easily picked up manually by one or two installers. This reduces the number of people and equipment required for installation and simplifies logistics. This design also reduces the number of fasteners, which consequently reduces the labor required for assembly.

In terms of tracking alignment, with a gear ratio of 1:361, a row of 20 tables may be aligned within one degree, while single stiff torque tube solar trackers have difficulty keeping the total twist under 6 degrees (e.g. has an angle of twist of less than 6 degrees), even under moderate wind conditions. With such high gear ratio, the torque requirement on the intra-table drive shafts and the inter-table drive shafts is very low compared to the conventional torque tube designs, resulting in a very small twist over the length of the row, even at the limit torque capacity. While the shaft under load may twist over the length of multiple tables, the twist reflected on the tables is further reduced by the gear ratio resulting in a much stiffer row with little discrepancy of tilt between tables.

In terms of thermal expansion, the modular tracker system 10 absorbs the changes in geometry at the table level rather than at the row level as is the case with a stiff long torque tube. The magnitude of thermal displacements is small such that, even under wide daily temperature changes, the bearings are negligibly displaced. For instance, with a daily thermal variation of 50° C., the maximum displacement induced at each bearing location is less than 0.±030 inches. Furthermore, the compliance in the connections between tables 12a-d insulates consecutive tables from additive thermal displacements.

In terms of frequency response, the modular tables have high natural frequencies, well above the problematic range of frequencies stimulated by wind gust effects. Any dynamic effect on a table is not transferred to the drive shaft in a way that may systematically affect the whole row, so natural frequencies are high, and amplitudes are small, resulting in a more robust design compared to conventional torque tubes.

An exemplary gearbox 310 for use with the modular tracker system 10, 10a, 10b is shown in FIG. 12A-13B. The gearbox 310 includes an input rotatable housing 312 and a second output 314 (e.g. a second output). The input rotatable housing 312 has a cylindrical sidewall 316 having a closed end 318 and an open end 320 opposite from the closed end 318. The second output 314 has a cylindrical sidewall 324 having a closed end 326 and an open end 328 opposite from the closed end 326, with the open end 320 of the cylindrical sidewall 316 adjacent to the open end 328 of the cylindrical sidewall 324 forming a gear housing enclosure 330 having a cylindrical shape. The input rotatable housing 312 also has a cylindrical opening 334 within the closed end 318 of the cylindrical sidewall 316 of the input rotatable housing 312, and the second output 314 also has a cylindrical opening 336 within the closed end 326 of the cylindrical sidewall 324 of the second output 314, which is opposite from the cylindrical opening 334. The open end 320 of the cylindrical sidewall 316 of input rotatable housing 312 may be concentrically disposed within the open end 328 of the cylindrical sidewall 324 of the second output 314, such that the cylindrical sidewall 324 partially overlaps the cylindrical sidewall 316, thereby creating partially overlapping cylindrical sidewalls. An O-ring 332 may be concentrically positioned between the partially overlapping cylindrical sidewalls and disposed within a concentric groove 332a in an outside perimeter of the cylindrical sidewall 316. The O-ring 332 may create a rotatable seal between the cylindrical sidewall 316 of input rotatable housing 312 and the cylindrical sidewall 324 second output 314.

The gearbox 310 also includes an input bearing housing enclosure 338 and an output bearing housing enclosure 342, with the input and output bearing housing enclosures, 338 and 342, integral with the gear housing enclosure 330. The input bearing housing enclosure 338 has a cylindrical shape with an open end 338a and an opposite open end 338b, with open end 338a concentrically integral with the cylindrical opening 334 of the input rotatable housing 312. A rotatable securing ring 340 is disposed within the open end 338b of the input bearing housing enclosure 338, with the rotatable securing ring 340 having an integral securing ring extension 344 that is not disposed within the open end of 338B of the input bearing housing enclosure 338. Preferably, an O-ring 340a may be positioned around the rotatable securing ring 340 and disposed within a concentric groove 340b around an outside perimeter of the rotatable securing ring 340. An elongate securing pin 344a may be inserted within a radial bore opening 344b that extends through the integral securing ring extension 344. Similarly, the output bearing housing enclosure 342 has a cylindrical shape with an open end 342a and an opposite open end 342b, with open end 342a concentrically integral with the cylindrical opening 336 of the second output 314. A rotatable securing ring 346 is disposed within the open end 342b of the output bearing housing enclosure 342, with the rotatable securing ring 346 having an integral securing ring extension 348 that is not disposed within the open end of 342b of output bearing housing enclosure 342. An O-ring 346a may be positioned around the rotatable securing ring 346 and disposed within a concentric groove 346b around an outside perimeter of the rotatable securing ring 346. An elongate securing pin 348a may be inserted within a radial bore opening 348b that extends through the integral securing ring extension 348. As will be described in greater detail below, the gearbox 310 also includes a gearbox shaft 350 that may be secured within the gearbox 310 by utilizing the integral securing ring extensions, 344, 348, and corresponding elongate securing pins 344a and 348a.

A first internal gear 362a is disposed within the gear housing enclosure 330 and is integral with the cylindrical sidewall 316, with the first internal gear 362a having a pitch diameter D1. A second internal gear 362b is similarly disposed within the gear housing enclosure 330 and is integral with the cylindrical sidewall 324, with the second internal gear 362b having a pitch diameter D2, which may be either larger or smaller than the pitch diameter D1 of the first internal gear 362a. As an example, the figures illustrate that the first internal gear 362a has a pitch diameter that is smaller than the pitch diameter of internal gear 362b. A first external gear ring 360a and a second external gear ring 360b are concentrically connected to form an integral differential gear ring 360 that is disposed within the gear housing enclosure 330, with the integral differential gear ring 360 having a concentric opening 364 through the integral differential gear ring 360. The first external gear ring 360a has a pitch diameter D3 that is smaller than the pitch diameter D1 of the first internal gear 362a, and the second external gear ring 360b has a pitch diameter D4 that is smaller than the pitch diameter D2 of the second internal gear 362b, with the first external gear ring 360a in partial engagement with the first internal gear 362a, as shown in FIG. 4A and with the second external gear ring 360b in partial engagement with the second internal gear 362b as shown in FIG. 4B.

The gearbox shaft 350, having an input 350a and a first output 350b, is disposed and secured within the gearbox 310. Specifically, the gearbox shaft 350 is disposed within: the gear housing enclosure 330; the input bearing housing enclosure, 338, including rotatable securing ring 340 and corresponding integral securing ring extension 344; and the output bearing housing enclosure 342, including rotatable securing ring 346 and corresponding integral securing ring extension 348. The input 350a of gearbox shaft 350 may extend a predetermined distance outside of the corresponding integral securing ring extensions 344, 348 and, thus, extend outside of the gearbox 310. The gearbox shaft 350 may be secured within the gearbox 310 by utilizing the integral securing ring extensions 344, 348, and corresponding elongate securing pins, 344a, 348a. The elongate securing pins, 344a, 348a, may be inserted through corresponding radial bore openings 344b, 348b, within corresponding integral securing ring extensions 344, 348, with the elongate securing pins 344a, 348a similarly inserted through corresponding radial bore openings 350c, 350d, within the gearbox shaft 350.

The drive shaft also comprises a rotor 352 that is integral with and eccentrically disposed around a center portion of the gearbox shaft 350, with the rotor 352 also disposed within the concentric opening 364 within the integral differential gear ring 360. The gearbox shaft 350 is supported, in part, within gearbox 310 by using several bearings. A rotor bearing 354, preferably a ball bearing, is journaled for rotation between the rotor 352 and the integral differential gear ring 360. A drive shaft bearing 356a, preferably a roller bearing, is journaled for rotation between the gearbox shaft 350 and the cylindrical opening 334, integral with input bearing enclosure 338, of rotatable housing 312, and another drive shaft bearing 356b, preferably a roller bearing, is similarly journaled for rotation between the gearbox shaft 350 and cylindrical opening 336, integral with input bearing enclosure 342, of second output 314, with drive shaft bearings 356a-b, adjacent to opposite sides of the rotor 352, respectively. An additional drive shaft bearing 358a, such as a roller bearing, is journaled for rotation between the gearbox shaft 350 and input bearing housing enclosure 338, and another drive shaft bearing 358b, preferably a roller bearing, is journaled for rotation between the gearbox shaft 350 and output bearing housing enclosure 342, with the drive shaft bearings, 358a-b, adjacent to rotatable securing rings 340 and 346, respectively.

As to each gearbox 310 out of the first pair of gearboxes 310, the rotating gearbox shaft 350 imparts an eccentric rotation to the rotor 352 around the rotating gearbox shaft 350, which in turn imparts an eccentric rotation to the first external gear ring 360a and to the second external gear ring 360b, with the first external gear ring 360a eccentrically rotating in engagement with the first internal gear 362a and with the second external gear ring 360b eccentrically rotating in engagement with the second internal gear 362b, and which in turn imparts a rotation to the second internal gear 362b and in turn a rotation to the second output 314 as it rotates around the rotating gearbox shaft 350, with the rotating second output 314 having an angular velocity that is less than the angular velocity of the rotating drive shaft, with the rotating second output 314 having a torque that is greater than the torque of the rotating gearbox shaft 350. The single motor 14 causes the gearbox shaft 350 to rotate within the gearbox 310 by rotating within the gear housing enclosure 330, the input and output bearing housing enclosures 338, 342, and corresponding integral securing ring extensions 344, 348.

With respect to the operation of the gearbox 310, when the single motor 14 is rotatably connected to the input 350*a* of gearbox shaft 350, the input rotatable housing 312 must be prevented from rotating by, for example, connecting the input rotatable housing 312 to a stationary structure, thereby converting the input rotatable housing 312, which may rotate, to an input rotatable housing 312, which is stationary and may not rotate. In this manner, the dual function gearbox 310 may impart a rotational motion to the second output 314. More specifically, when rotational motion is imparted by the single motor 14 to the input 350*a* of the gearbox shaft 350, the rotating gearbox shaft 350 imparts an eccentric rotation to the rotor 352 around the rotating gearbox shaft 350; which in turn imparts an eccentric rotation to the first external gear ring 360*a* and to the second external gear ring 360*b*, with the first external gear ring 360*a* eccentrically rotating in engagement with the first internal gear 362*a*, which does not rotate since the first internal gear 362*a* is integral with the input rotatable housing 312 which is prevented from rotating, and with the second external gear ring 360*b* eccentrically rotating in engagement with the second internal gear 362*b*, and which in turn imparts a rotation to the second internal gear 362*b* and in turn imparts a rotation to the integral second output 314 that rotates around the rotating gearbox shaft 350, with the rotating second output 314 having an angular velocity that is less than the angular velocity of the rotating drive shaft, and with the rotating second output 314 having a torque that is greater than the torque of the rotating gearbox shaft 350.

As previously described, a feature of the dual function gearbox 310 is that it can operate symmetrically in that motor 14 can be rotatably connected to either the input end 530*a* of the gearbox shaft 350, as described above, or connected to the opposite first output 350*b* of gearbox shaft 550, without in any manner altering the performance characteristics of the dual function gearbox 310 described above. Thus, when the motor 14 is connected to the first output 350*b* of the drive shaft 50, with the second output 314 prevented from rotating, the input rotatable housing 312 can rotate, just like the second output 314 can rotate when the motor 14 is rotatably connected to the input 350*a* of gearbox shaft 350. As a result, it should be understood that the reference to the "input" 350*a* and "first output" 350*b* of the gearbox shaft 350 and to all other similar designations, such as: input rotatable housing 312, second output 314, input bearing housing enclosure 338, and output bearing housing enclosure 42, are merely arbitrary conventions that have been followed to accurately describe the dual function gearbox 310 and the manner of its operation.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A modular tracker system, comprising:
   first and second tables rotatably arranged in a row, each of the first and second tables including:
      a support structure including first and second mounting posts that are configured to be mounted in the ground;
      a frame supported by the support structure;
      at least one solar panel supported by the frame;
      a first gearbox operatively coupled to the first mounting post and defining an axis of rotation, the first gearbox having first and second outputs, wherein the first output has a first rotational speed about the axis of rotation and the second output has a second rotational speed about the axis of rotation that is less than the first rotational speed, and wherein the second output is operatively coupled to the frame; and
      a second gearbox operatively coupled to the second mounting post and concentrically aligned with the first gearbox of the same table, the second gearbox having first and second outputs, wherein the first output has the first rotational speed about the axis of rotation and the second output has the second rotational speed about the axis of rotation,
   a single motor driving both the first and second tables;
   a first intra-table drive shaft connecting the first and second gearboxes of the first table;
   a second intra-table drive shaft connecting the first and second gearboxes of the second table, and
   an inter-table drive shaft coupling the second gearbox of the first table with the first gearbox of the second table to connect the first and second tables, whereby the first and second tables are rotated synchronously.

2. The modular tracker system of claim 1,
   wherein an input of the first gearbox of the first table is coupled to the single motor,
   wherein the first output of the first gearbox of the first table is coupled to a first end of the first intra-table drive shaft, and
   wherein the first output of the second gearbox of the first table is coupled to a second end of the first intra-table drive shaft that is disposed opposite the first end of the first intra-table drive shaft.

3. The modular tracker system of claim 2,
   wherein an input of the second gearbox of the first table is coupled to a first end of the inter-table drive shaft, and
   wherein an input of the first gearbox of the second table is coupled to a second end of the inter-table drive shaft that is disposed opposite the first end of the inter-table drive shaft.

4. The modular tracker system of claim 1,
   wherein the single motor is coupled to the first output of the first gearbox of the first table,
   wherein an input of the first gearbox of the first table is coupled to a first end of the first intra-table drive shaft, and
   wherein an input of the second gearbox of the first table is coupled to a second end of the first intra-table drive shaft that is disposed opposite the first end of the first intra-table drive shaft.

5. The modular tracker system of claim 1, further comprising:

a universal joint connecting the inter-table drive shaft to at least one of the second gearbox of the first table and the first gearbox of the second table allowing rotation to be transmitted from the first table to the second table without imposing alignment requirements.

6. The modular tracker system of claim 5,
wherein the inter-table drive shaft includes a hollow shaft having first and second through holes,
wherein the first gearbox of the second table includes a gearbox shaft including an elongate slot disposed therethrough, and
wherein the universal joint further comprises:
a yoke having arcuately shaped end surfaces disposed opposite one another, and a through hole extending between the arcuately shaped end surfaces, and
a fastener extending through the first through hole of the inter-table drive shaft, the through hole of the yoke, the elongate slot of the gearbox shaft, and the second through hole of the inter-table drive shaft.

7. The modular tracker system of claim 6, wherein the universal joint further comprises:
a bracket having a first end and a second end disposed opposite the first end, wherein the first end includes first and second through holes,
wherein the fastener extends through the first through hole of the first end of the bracket, through the first through hole of the inter-table drive shaft, the through hole of the yoke, the elongate slot of the gearbox shaft, the second through hole of the first inter-table drive shaft, and through the second through hole of the first end of the bracket.

8. The modular tracker of claim 1, wherein the inter-table drive shaft is a flexible shaft that has an angle of bending of less than 6 degrees, and is configured to be rigid enough to carry the torque load, yet flexible enough to accommodate misalignment by bending.

9. The modular tracker system of claim 1, further comprising:
at least one rigid joint that couples the first and second gearboxes of the first table to the first intra-table drive shaft.

10. The modular tracker system of claim 9,
wherein the first intra-table drive shaft includes a hollow shaft including first and second through holes disposed adjacent a first end of the first intra-table drive shaft,
wherein the first gearbox of the first table includes a gearbox shaft including an elongate slot, and
wherein the rigid joint that couples the first gearbox of the first table to the first intra-table drive shaft further comprises:
a spacer including a first through hole extending in a first direction and a second through hole extending in a direction perpendicular to the first direction and configured to accept the gearbox shaft, and
a fastener extending through the first through hole of the first intra-table drive shaft, the first through hole of the spacer, the elongate slot of the gearbox shaft, and the second through hole of the first intra-table drive shaft.

11. The modular tracker system of claim 10, wherein the rigid joint that couples the first gearbox of the first table to the first intra-table drive shaft further comprises:
a bracket having a first end and a second end disposed opposite the first end, wherein the second end includes first and second through holes,
wherein the fastener extends through the first through hole of the second end of the bracket, the first through hole of the first intra-table drive shaft, the first through hole of the spacer, the elongate slot of the gearbox shaft, the second through hole of the first intra-table drive shaft, and through the second through hole of the second end of the bracket.

12. The modular tracker of claim 1,
wherein the first gearbox of the first table is coupled to the first mounting post using a mounting bracket and a lever arm.

13. The modular tracker system of claim 1, further comprising:
a first spherical bearing supporting the first output of each of the first gearboxes of the first and second tables;
a second spherical bearing supporting the first output of each of the second gearboxes of the first and second tables.

14. The modular tracker system of claim 1,
wherein the first and second gearboxes of the first table are aligned along a first axis of rotation, and
wherein the first and second gearboxes of the second table are aligned along a second axis of rotation different from the first axis of rotation.

15. The modular tracker of claim 1, wherein an input of the first gearbox is formed on a common shaft as the first output of the first gearbox whereby the input has the first rotational speed.

16. The modular tracker of claim 1, wherein the first output of the first gearbox of the first table has a speed ratio of about 1:1 compared to an input of the first gearbox of the first table and the second output of the first gearbox of the first table has a speed ratio of about 1:60 or less compared to the input.

17. A modular tracker system, comprising: first and second tables rotatably arranged in a row, each of the first and second tables including: a support structure configured to be mounted in the ground;
a frame supported by the support structure;
a plurality of solar panels supported by the frame;
a first gearbox supported by the support structure, the first gearbox having first and second coaxial outputs, wherein the first output has a first rotational speed and the second output has a second rotational speed that is less than the first rotational speed, and wherein the second output is operatively coupled to the frame;
a second gearbox supported by the support structure and concentrically aligned with the first gearbox of the same table, the second gearbox having first and second coaxial outputs, wherein the first output has the first rotational speed and the second output has the second rotational speed and is operatively coupled to the frame;
a single motor driving both the first and second tables; a first intra-table drive shaft connecting the first and second gearboxes of the first table; a second intra-table drive shaft connecting the first and second gearboxes of the second table; and an inter-table drive shaft coupling the second gearbox of the first table with the first gearbox of the second table to connect the first and second tables, whereby the first and second tables are rotated synchronously.

18. The modular tracker system of claim 1, wherein the axis of rotation defined by the first gearbox of each of the first and second tables coincides with an axis of rotation of the respective table.

19. The modular tracker system of claim 17, wherein the first and second outputs of each of the first and second gearboxes define an axis of rotation about which the plurality of solar panels are rotated.

\* \* \* \* \*